(12) United States Patent
Jung et al.

(10) Patent No.: US 11,898,064 B2
(45) Date of Patent: Feb. 13, 2024

(54) ADHESIVE COMPOSITION INCLUDING AT LEAST TWO TYPES OF DYES, ADHESIVE SHEET, AND DISPLAY DEVICE INCLUDING SAME

(71) Applicant: LMS Co., Ltd., Pyeongtaek-si (KR)

(72) Inventors: Joon Ho Jung, Hwaseong-si (KR); Hyun Young Joo, Daegu (KR)

(73) Assignee: LMS CO., LTD., Pyeongtaek-si (KR)

( * ) Notice: Subject to any disclaimer, the term of this patent is extended or adjusted under 35 U.S.C. 154(b) by 688 days.

(21) Appl. No.: 16/915,647

(22) Filed: Jun. 29, 2020

(65) Prior Publication Data
US 2020/0325363 A1 Oct. 15, 2020

Related U.S. Application Data

(63) Continuation of application No. PCT/KR2018/016078, filed on Dec. 18, 2018.

(30) Foreign Application Priority Data

Dec. 29, 2017 (KR) .................. 10-2017-0183738

(51) Int. Cl.
| | | |
|---|---|---|
| C09J 11/06 | (2006.01) | |
| C09J 11/04 | (2006.01) | |
| C09J 11/08 | (2006.01) | |
| C09B 67/20 | (2006.01) | |

(Continued)

(52) U.S. Cl.
CPC ............. *C09J 11/06* (2013.01); *C09B 23/143* (2013.01); *C09B 57/00* (2013.01); *C09B 67/0063* (2013.01); *C09J 7/10* (2018.01); *C09J 11/04* (2013.01); *C09J 11/08* (2013.01); *B32B 2307/71* (2013.01); *B32B 2457/20* (2013.01); *B32B 2457/202* (2013.01); *B32B 2457/204* (2013.01); *B32B 2457/206* (2013.01); *C08K 5/315* (2013.01); *C08K 5/3492* (2013.01);

(Continued)

(58) Field of Classification Search
None
See application file for complete search history.

(56) References Cited

U.S. PATENT DOCUMENTS

| | | |
|---|---|---|
| 2011/0020251 A1 | 1/2011 | Shih et al. |
| 2013/0085215 A1 | 4/2013 | Shitara et al. |

FOREIGN PATENT DOCUMENTS

| | | | |
|---|---|---|---|
| JP | 2011-175053 A | | 9/2011 |
| JP | 2011175053 A | * | 9/2011 |

(Continued)

OTHER PUBLICATIONS

Chinese Office Action for corresponding Chinese Application No. 201880083354.3 dated Jan. 28, 2021, citing the above reference(s).

(Continued)

*Primary Examiner* — Eli D. Strah
(74) *Attorney, Agent, or Firm* — Hauptman Ham, LLP

(57) ABSTRACT

The present invention discloses a adhesive sheet effectively blocking light in the ultraviolet light region without deteriorating the transmittance with respect to the visible light region and the adhesiveness and a adhesive composition including binder resin and light absorption dye dispersed in the binder resin, and it is possible to effectively block light under the 410 nm wavelength region and to be applied to a various kinds of display devices.

13 Claims, 3 Drawing Sheets

(51) Int. Cl.
*C09B 57/00* (2006.01)
*C09B 23/14* (2006.01)
*C09J 7/10* (2018.01)
*C08K 5/315* (2006.01)
*C08K 5/3492* (2006.01)

(52) U.S. Cl.
CPC .... *C09J 2203/318* (2013.01); *C09J 2301/408* (2020.08); *C09K 2323/03* (2020.08); *C09K 2323/031* (2020.08); *C09K 2323/05* (2020.08); *C09K 2323/053* (2020.08); *C09K 2323/057* (2020.08)

(56) References Cited

FOREIGN PATENT DOCUMENTS

| | | | |
|---|---|---|---|
| KR | 10-2013-0035963 A | 4/2013 | |
| KR | 10-1766284 B1 | 8/2017 | |
| WO | 01-47900 A1 | 7/2001 | |
| WO | 2017/222328 A1 | 12/2017 | |
| WO | WO-2017222328 A1 * | 12/2017 | ............... B32B 7/12 |

OTHER PUBLICATIONS

International Search Report dated Apr. 10, 2019, in connection with corresponding International Patent Application No. PCT/KR2018/016078, citing the above references.
Written Opinion issued in corresponding International Patent Application No. PCT/KR2018/016078 dated Apr. 10, 2019, citing the above references.

* cited by examiner

ADHESIVE COMPOSITION INCLUDING AT LEAST TWO TYPES OF DYES, ADHESIVE SHEET, AND DISPLAY DEVICE INCLUDING SAME

PRIORITY

This application is continuation of International Application No. PCT/KR2018/016078 filed on Dec. 18, 2018, which claims priority to Korean Application No. 10-2017-0183738 filed on Dec. 29, 2017, which applications are incorporated herein by reference.

BACKGROUND ART

1. Field of the Disclosure

The present invention is related to an adhesive sheet having an excellent ultraviolet blocking function, an adhesive composition, and a display device including these.

2. Description of the Related Art

Recently, a flat panel display is drawing attention as a display device. Such a flat panel display device includes a liquid crystal display, a plasma display panel, and an organic light emitting display device, etc.

Among them, since the organic light emitting display device has a wide viewing angle with fast response speed, it is possible to be implemented for a high-resolution display. In particular, the organic light emitting display having a microcavity structure has an advantage to increase the output efficiency by using the light resonance effect between the upper and the bottom electrodes and light color purity. Such an organic light emitting display device includes a substrate, a transparent first electrode formed on the substrate, an organic layer formed on the first electrode, and a second electrode formed on the organic layer and having a high reflective rate. Typically, a glass substrate or a plastic substrate is used as the substrate. And, the organic layer includes a hole injection layer, a hole transport layer, a light generation layer, a hole blocking layer and an electron transport layer. In other words, a multilayer structure organic light emitting display device can be manufactured by stacking a plurality of organic layers between the first electrode and the second electrode.

However, these display devices have a problem in not effectively blocking light in the ultraviolet region, and this can deteriorate the visibility of the device, and particularly, it is a cause of deteriorating the durability of the device in an outdoor use environment where sunlight is irradiated.

SUMMARY

The object of the present invention is to provide an adhesive sheet and an adhesive composition which can effectively block light in the ultraviolet region without deteriorating the transmittance with respect to the visible light region and the adhesiveness.

Another object of the present invention is to provide a display device including the adhesive sheet and the adhesive composition.

To solve the object of the present the invention,
in one embodiment of the present invention,
the adhesive sheet is provided to have a structure wherein a first light absorption dye and a second light absorption dye are dispersed in an adhesive binder resin,
a combined amount of the first light absorption dye and the light second absorption dye is 90 parts by weight or less with a reference to 100 parts by weight of the adhesive binder resin; and the first light absorption dye is represented by Formula 1 and the second light absorption dye is represented by Formula 2.

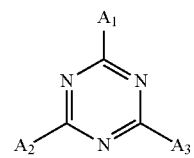

[Formula 1]

In Formula 1,
$A_1$, $A_2$ and $A_3$ are each independently a phenyl or a Formula 1-a; and
one or more of $A_1$, $A_2$ and $A_3$ are a Formula 1-a; and

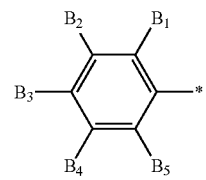

[Formula 1-a]

in Formula 1-a,
$B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or Formula 1-b; and

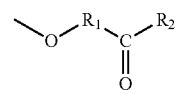

[Formula 1-b]

in, Formula 1-b,
$R_1$ is an alkylene having a carbon number of 1 to 6, $R_2$ is a hydrogen, a hydroxy group, an alkoxy group having a carbon number 1 of 16, an alkyl group having a carbon number 1 of 12 or an alkylamine group having a carbon number of 1 to 12; and one or more hydrogen of $A_1$, $A_2$ and $A_3$ in the Formula 1 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, a heteroaryl group having a carbon number of 2 to 20, an aryloxy group having a carbon number of 6 to 20, an arylthio group having a carbon number of 6 to 20, alkoxycarbonyl group having a carbon number 1 of 12, a halogen group, a cyano group, a nitro group, a hydroxyl group and a carboxyl group; and

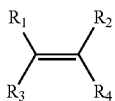

[Formula 2]

in Formula 2, $R_1$ to $R_3$ are each independently a hydrogen, a cyano group, or represented by a Formula 2-a; and

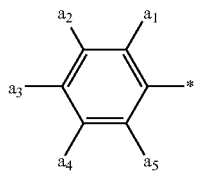

[Formula 2-a]

in Formula 2-a, $a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and $R_4$ is a hydrogen, a cyano group, or a Formula 2-b; and

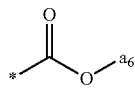

[Formula 2-b]

$a_6$ is a hydrogen or an alkyl group having a carbon number of 1 to 18; and one or more hydrogen of $R_1$ to $R_4$ in the Formula 2 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group.

In another embodiment, the present invention provides an adhesive composition that comprises a binder resin; and at least one or more of a first light absorption dye and a second light absorption dye dispersed in the binder resin wherein the first light absorption dye is represented by a Formula 1 and the second light absorption dye is represented by Formula 2.

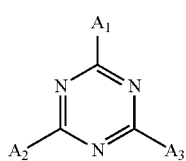

[Formula 1]

In Formula 1, $A_1$, $A_2$ and $A_3$ are each independently a phenyl or a Formula 1-a; and one or more of $A_1$, $A_2$ and $A_3$ are a Formula 1-a; and

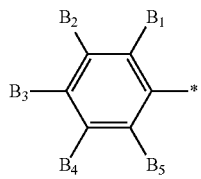

[Formula 1-a]

in Formula 1-a, $B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or Formula 1-b; and

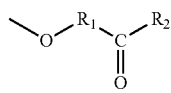

[Formula 1-b]

in Formula 1-b, $R_1$ is an alkylene having a carbon number of 1 to 6, $R_2$ is a hydrogen, a hydroxy group, an alkoxy group having a carbon number 1 of 16, an alkyl group having a carbon number 1 of 12 or an alkylamine group having a carbon number of 1 to 12, and one or more hydrogen of $A_1$, $A_2$ and $A_3$ in the Formula 1 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, a heteroaryl group having a carbon number of 2 to 20, an aryloxy group having a carbon number of 6 to 20, an arylthio group having a carbon number of 6 to 20, alkoxycarbonyl group having a carbon number 1 of 12, a halogen group, a cyano group, a nitro group, a hydroxyl group and a carboxyl group; and

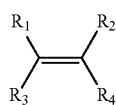

[Formula 2]

in Formula 2, $R_1$ to $R_3$ are each independently a hydrogen, a cyano group, or represented by a Formula 2-a; and

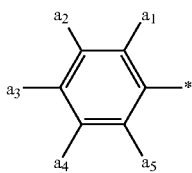

[Formula 2-a]

in Formula 2-a, $a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and $R_4$ is a hydrogen, a cyano group, or a Formula 2-b; and

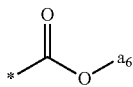

[Formula 2-b]

in Formula 2-b, $a_6$ is a hydrogen or an alkyl group having a carbon number of 1 to 18; and one or more hydrogen of $R_1$ to $R_4$ in the Formula 2 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group.

In another embodiment, the present invention provides a display device including an adhesive layer formed by the previously described adhesive composition.

The adhesive composition and/or the adhesive sheet according to the present invention can effectively block light in the ultraviolet wavelength region without deteriorating the transmittance with respect to the visible light region and thereby it can be applied to various display devices.

DETAILED DESCRIPTION

Figure 1:
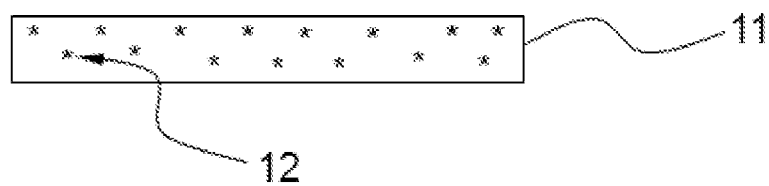
FIG. 1 is a schematic diagram disclosing a cross-section of an adhesive sheet according to one embodiment of the present invention.

Since the present invention provides a variety of modifications and can have many embodiments, specific embodiments are disclosed in the drawings and described in details. However, it is not intended to limit the present invention to a specific embodiment and thus, it should be understood to include all the modifications, equivalents and replacements included within the idea and technical scope of the present invention.

In the present invention, words such as "include," "have," or "configure" are only to indicate the existence of the characteristic, the number, the operation, the element, the part, or their combination but it shall be understood not to exclude in advance their possibility of the existence or the addition of one or more of different characteristic, the number, the step, the operation, the element, the part, or their combination.

In addition, it should be understood that the attached drawings in the present invention are disclosed to be enlarged or shrunk for the convenience of explanation.

Below, the present invention will be explained in detail with the reference to the drawings and the same reference numbers will be given to the same or corresponding elements regardless to the numbers in the drawing and the overlapped explanation will be omitted to these.

Furthermore, an "alkyl group" means a substituent derived from a saturated hydrocarbon in the form of linear or branched.

In this case, as for the "alkyl group," for example, it can be a methyl group, an ethyl group, an n-propyl, an iso-propyl group, an n-butyl group, a sec-butyl group, a tert-butyl group, an n-pentyl group, a 1,1-dimethylpropyl group, a 1,2-dimethylpropyl group, a 2,2-dimethylpropyl group, a 1-ethylpropyl group, a 2-ethylpropyl group, an n-hexyl group, a 1-methyl-2-ethylpropyl group, 1-ethyl-2-methylpropyl group, a 1,1,2-trimethylpropyl group, a 1-propylpropyl group, a 1-methylbutyl group, a 2-methylbutyl group, a 1,1-dimethylbutyl group, a 1,2-dimethylbutyl group, a 2,2-dimethylbutyl group, a 1,3-dimethylbutyl group, a 2,3-dimethylbutyl group, a 2-ethylbutyl group, a 2-methylpentyl group, a 3-methylpentyl group, an n-octyl group, or a 2-ethylhexyl group, etc.

In addition, "alkyl group" can have a carbon number of 1 to 20, for example, it can have a carbon number of 1 to 6 or a carbon number of 1 to 4.

Moreover, a "cycloalkyl group" in the present invention means a substituent derived from a monocyclic saturated hydrocarbon.

For example, as for the "cycloalkyl group" it can be a cyclopropyl group, a cyclobutyl group, a cyclopentyl group, a cyclohexyl group, a cycloheptyl group, or a cyclooctyl group, etc.

In addition, the "cycloalkyl group" can have a carbon number of 3 to 20, for example, it can have a carbon number of 3 to 12, or a carbon number of 3 to 6.

Furthermore, an "aryl group" in the present invention means one monovalent substituent derived from an aromatic hydrocarbon.

In this case, as for the "aryl group," for example, it can be a phenyl group, a naphthyl group, an anthracenyl group, a phenanthryl group, a naphthacenyl group, a pyrenyl group, a tolyl, a biphenyl group, a terphenyl group, a chrycenyl group, a spirobifluorenyl group, a fluoranthenyl group, a fluorenyl group, a perylenyl group, an indenyl group, an azulenyl group, a heptalenyl group, a phenalenyl group, or a phenanthrenyl group, etc.

In addition, the "aryl group" can have a carbon number of 6 to 30, for example, it can have a carbon number of 6 to 10, a carbon number of 6 to 14, a carbon number of 6 to 18 or a carbon number of 6 to 12.

Moreover, a "heteroaryl group" in the present invention means an "aromatic heterocyclic ring" or "heterocyclic" derived from a monocyclic or from a condensed ring. The "heteroaryl group" can include at least one, for example one, two, three or four from nitrogen (N), sulfur (S), oxygen (O), phosphorus (P), selenium (Se), and silicon (Si) as a hetero atom.

In this case, as for the "heteroaryl group," for example, it can be a nitrogen-containing heteroaryl group including a pyrrolyl group, a pyridyl group, a pyridinyl group, a pyridazinyl group, a pyrimidinyl group, a pyrazinyl group, a triazolyl group, a tetrazolyl group, a benzotriazolyl group, a pyrazolyl group, an imidazolyl group, a benzimidazolyl group, an indolyl group, an indolinyl group, an isoindolyl group, an indolizinyl group, a purinyl group, an indazolyl group, a quinolyl group, an isoquinolinyl group, a quinolizinyl group, a phthalazinyl group, a naphthylidinyl group, a quinoxalinyl group, a quinazolinyl group, a cinnolinyl group, a pteridinyl group, an imidazotriazinyl group, an acridinyl group, a phenanthridinyl group, a carbazolyl group, a carbazolinyl group, a phenanthrolinyl group, a phenazinyl group, an imidazopyridinyl group, an imidazopyrimidinyl group, and a pyrazolopyridinyl group, etc., a sulfur-containing heteroaryl group including a thienyl group, a benzothienyl group, and a dibenzothienyl group, etc., or an oxygenated heteroaryl group including a furyl group, a pyranyl group, a cyclopentapyranyl group, a benzofuranyl group, an isobenzofuranyl group, a dibenzofuranyl group, a benzodioxole group, and benzotrioxole group, etc.

In addition, for the specific example of the "heteroaryl group," it can be compound including at least two or more hetero atoms such as a thiazolyl group, an isothiazolyl group, a benzothiazolyl group, a benzothiadiazolyl group, a phenothiazinyl group, an isoxazolyl group, a furazanyl group, a phenoxazinyl group, an oxazolyl group, a benzoxazolyl group, an oxadiazolyl group, a pyrazoloxazolyl group, an imidazothiazolyl group, a thienofuranyl group, a furopyrrolyl group, or a pyridoxazinyl group, etc.

Furthermore, the "heteroaryl group" can have a carbon number of 2 to 20. For example, it can have a carbon number of 4 to 19, a carbon number of 4 to 15, or a carbon number of 5 to 11. For example, the heteroaryl group can have a ring member of 5 to 21 if including the hetero atom.

In addition, an "aralkyl group" in the present invention means a saturated hydrocarbon substituent where one monovalent substituent derived from an aromatic hydrocarbon at the hydrogen position in the end of the hydrocarbon is combined. In other words, the "aralkyl group" represents an alkyl group which a chain terminal is substituted to an aryl group, and for example, it can be a benzyl group, a phenethyl group, a phenylpropyl group, a naphthalenylmethyl group, or a naphthalenylethyl group, etc.

Furthermore, the "adhesive" in the present invention calls for all the cases where the adhesiveness exists with an adjacent substrate and all the cases for the adhesive or the adhesion depending on the degree of the adhesiveness are included.

Below, the present invention will be described in details.

The present invention provides an adhesive sheet having a structure wherein a light absorption dye is dispersed in a pressure-sensitive adhesive binder resin. The adhesive sheet according to the present invention comprises a structure including the light absorption dye. In one embodiment, the adhesive sheet according to the present invention comprises a structure including a resin matrix and the light absorption dye dispersed in the resin matrix. Specifically, the light absorption dye includes at least one or more of a first and a second light absorption dye and for example, the first light absorption dye is triazine dye and the second light absorption dye is a dye including a double combination.

In one example, the adhesive sheet according to the present invention has the first and the second light absorption dyes dispersed in the adhesive binder resin a combined amount of the first light absorption dye and the light second absorption dye is 90 parts by weight or less with a reference to 100 parts by weight of the adhesive binder resin; and the first light absorption dye is represented by a Formula 1 and the second light absorption dye is represented by a Formula 2.

[Formula 1]

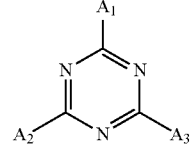

In Formula 1, $A_1$, $A_2$ and $A_3$ are each independently a phenyl or a Formula 1-a; and one or more of $A_1$, $A_2$ and $A_3$ are a Formula 1-a; and

[Formula 1-a]

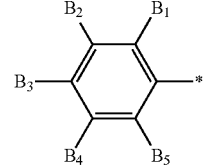

in Formula 1-a, $B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or Formula 1-b; and

[Formula 1-b]

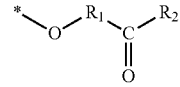

in, Formula 1-b, $R_1$ is an alkylene having a carbon number of 1 to 6, $R_2$ is a hydrogen, a hydroxy group, an alkoxy group having a carbon number 1 of 16, an alkyl group having a carbon number 1 of 12 or an alkylamine group having a carbon number of 1 to 12; and one or more hydrogen of $A_1$, $A_2$ and $A_3$ in the Formula 1 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, a heteroaryl group having a carbon number of 2 to 20, an aryloxy group having a carbon number of 6 to 20, an arylthio group having a carbon number of 6 to 20, alkoxycarbonyl group having a carbon number 1 of 12, a halogen group, a cyano group, a nitro group, a hydroxyl group and a carboxyl group.

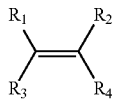

[Formula 2]

in Formula 2, $R_1$ to $R_3$ are each independently a hydrogen, a cyano group, or represented by a Formula 2-a; and

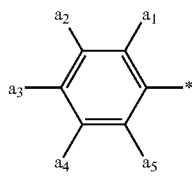

[Formula 2-a]

in Formula 2-a, $a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and $R_4$ is a hydrogen, a cyano group, or a Formula 2-b; and

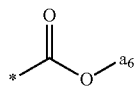

[Formula 2-b]

in Formula 2-b, $a_6$ is a hydrogen or an alkyl group having a carbon number of 1 to 18; and one or more hydrogen of $R_1$ to $R_4$ in the Formula 2 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group.

More specifically, in Formula 1-a, the first light absorption dye is, for example, $B_1$ to $B_5$ are each independently hydrogen, a hydroxy group, the alkyl group having a carbon number of 1 to 20, the cycloalkyl group having a carbon number of 3 to 20, the alkoxy group having a carbon number 1 to 10, the aralkyl group having a carbon number of 7 to 20, the aryl group having a carbon number of 6 to 18 or the Formula 1-b, and one or more of $B_1$ to $B_5$ are the cases represented by Formula 1-b.

In one example, the amount of the light absorption dye dispersed in the binder resin can be 90 parts by weight or less with a reference to 100 parts by weight of the adhesive binder resin in the adhesive sheet. More specifically, the amount of the light absorption dye can be in the range of 3 to 90 parts by weight, 4 to 87 parts by weight, 5 to 75 parts by weight, 50 to 90 parts by weight, or 55 to 87 parts by weight. By controlling the amount of the light absorption dye within the range stated above, light in the ultraviolet region can be effectively and selectively blocked without deteriorating the transmittance with respect to the visible light region. On the other hand, if the amount of the light absorption dye dispersed in the binder resin is too high, the adhesion strength of the adhesive sheet is lowered and if the amount of the light absorption dye is extremely low, the transmittance in 400-430 nm range is increased and thereby there is a problem of not effectively blocking the light in the ultraviolet region.

In one embodiment, a mixing rate of the first light absorption dye and the second light absorption dye according to the present application can be in the range of 1:99 to 99:1 weight ratio. Specifically, the mixing ratio of the first light absorption dye and the second light absorption dye can be in the range of 1:3 to 99:1 weight ratio, 1:2 to 99:1 weight ratio, 1:1 to 99:1 weight ratio, 1:10 to 20:1, or 1:5 to 15:1 weight ratio. By mixing the amount of the two light absorption dyes as stated range above, the present invention can selectively and effectively block the light in the ultraviolet region without deteriorating the transmittance with respect to the visible light region.

In one example, the adhesive sheet satisfies Condition 1 and Condition 2 below.

[Condition 1]

A Tight transmittance for the 405 nm wavelength is 5% or less;

a light transmittance for the 410 nm wavelength is 10% or less; and a light transmittance for the wavelength of 420 nm is 60% or less; and

[Condition 2]

a light transmittance of 430 nm wavelength is 75% or more and

In addition, the sheet can satisfy Condition 3 below.

$|T_{20\%} - T_{10\%}| < 5$ (nm) wherein [Condition 3]

$T_{20\%}$ represents a wavelength value where a light transmittance is 20% in 405 to 430 nm wavelength range; and $T_{10\%}$ represents a wavelength value where a light transmittance is 10% in 405 to 430 nm wavelength range.

For the adhesive sheet according to the present invention, it can be seen through Condition 3 that the slope of the light absorption spectrum is very steep in 405 to 430 nm wavelength range. Through this, it can be seen that the light with respect to the wavelength range of 405 nm or below can be effectively blocked while the transmission of the light with respect to the wavelength range of 430 nm or above is not deteriorated at the same time.

In particular, the adhesive sheet according to the present invention effectively blocks the light with respect to the wavelength range of 410 nm or below. Through this, the color change due to the ultraviolet irradiation when exposed to the sunlight or the color temperature change due to the color coordinate shift can be prevented or decreased by applying the adhesive sheet to the display device.

More specifically, the adhesive sheet can satisfy Conditions 4 and 5 below.

[Condition 4]

A light transmittance for the 405 nm wavelength is an average of 0.5% or less;

a light transmittance for the 410 nm wavelength is 5% or less; and a light transmittance for the wavelength of 420 nm is 52% or less; and

[Condition 5]

a light transmittance of 430 nm wavelength is 85% or more.

Although the thickness of the adhesive sheet is not particularly limited as long as it is in the range which can be applied to the display device, it can be in the range of to 350 μm in average. Specifically, the thickness of the adhesive sheet can be in the range of 100 to 300 μm range or 10 to 30 μm in average. On the other hand, when the thickness of the adhesive sheet is in the range of 10 to 30 PI in average, the adhesive strength can suitably be maintained.

On the other hand, when the thickness of the adhesive sheet is in the range of 10 to 30 μm in average, the adhesion strength of the adhesive sheet with respect to a glass can be 360 gf/inch or more and, specifically, the adhesive sheet can be in the range of 360 to 500 gf/inch or 370 to 450 gf/inch. For example, for the adhesive sheet according to the present invention, the adhesion strength with respect to the glass can be in the range of 360 to 500 gf/inch or 370 to 450 gf/inch when the average thickness is 18 μm. By controlling the adhesion strength within the stated range above, the adhesive sheet according to the present invention can obtain a sufficient anti-scattering effect and furthermore, it has an advantage for an easy rework process for the glass recycling in case of the process failure.

The adhesive sheet according to the present invention includes cases where it was manufactured as a film type with the adhesive composition or manufactured by depositing on the substrate. Since the process of manufacturing the film using the adhesive composition is a publicly known subject, a detailed description is omitted.

If needed, the adhesive sheet according to the present invention may further include particulate components. For example, the adhesive layer may further include the particulate components having the average refractive index of 1.3 to 2.1.

In addition, the adhesive sheet may further include a release film formed on one or both sides of the adhesive sheet. This is for the moving convenience or transferring convenience for the process step.

The adhesive sheet may further include an optical film. For example, as the optical film, a case for a polarizing film is included. For example, such a adhesive sheet can be applied to a various type of display devices. The polarizing film can be a multilayer structure including a polarizer and a retardation film. As an example, the polarizing film may include the adhesive layer or the adhesive sheet between the polarizer and the retardation film. The polarizer, for example, may be a TAC/PVA/TAC structure. In addition, the retardation film may be a structure formed of a PC, a COP or a separate coating layer. For example, the retardation film is a λ/4 retardation film or a λ/2 retardation film.

It was confirmed that the adhesive sheet according to the present invention can selectively block the light in the ultraviolet region by using the mixture of the light absorption dyes. The adhesive sheet can minimize the color change, i.e., the color temperature change in the display device since it can achieve the excellent light resistance by minimizing the spectral transmittance change with respect to the sunlight exposure. Specifically, after performing an experiment repeating a process where the adhesive sheet was exposed for 8 hours with the sunlight irradiation condition under 85° C. temperature and then it was exposed for 8 hours with the sunlight cut-off condition and the experiment was conducted 45 times, the difference between the spectral transmittance with respect to 405 nm wavelength light before the experiment ($T_0$,%) and the spectral transmittance with respect to the same wavelength light after the experiment ($T_1$,%) is calculated. A xenon lamp was used for the sunlight exposure experiment with the illuminance of 700~900 W/m².

As an example, the adhesive sheet satisfies the following Condition 6 under the sunlight exposure experiment.

$$|T_1-T_0|\leq 5(\%)$$ [Condition 6]

In Condition 6, $T_0$ indicates the spectral transmittance with respect to 405 nm wavelength light measured before the sunlight exposure experiment as to a specimen and $T_1$ indicates the spectral transmittance with respect to 405 nm wavelength light measured after the sunlight exposure experiment as to the specimen.

More specifically, it was experimentally confirmed that the spectral transmittance change amount is in the range of 5% or less, 3% or less, or 1% or less.

In addition, the present invention provides the adhesive composition and as one embodiment, the adhesive composition includes a binder resin; and a light absorption dye dispersed in the binder resin. Specifically, the adhesive composition includes a binder resin and at least one or more of a first and a second light absorption dye dispersed in the binder resin, and the first light absorption dye is represented as Formula 1 and the second light absorption dye is represented as Formula 2 below.

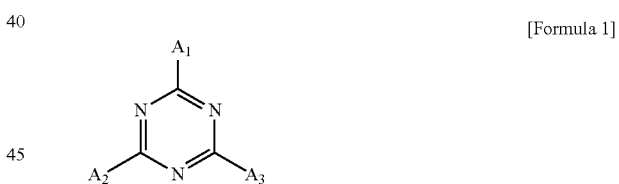

[Formula 1]

In Formula 1, $A_1$, $A_2$ and $A_3$ are each independently a phenyl or a Formula 1-a;

one or more of $A_1$, $A_2$ and $A_3$ are a Formula 1-a; and

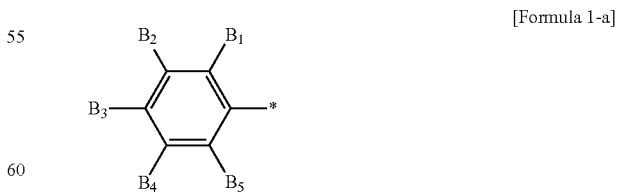

[Formula 1-a]

in Formula 1-a, $B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or Formula 1-b; and

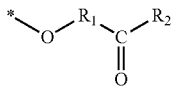

[Formula 1-b]

in, Formula 1-b, $R_1$ is an alkylene having a carbon number of 1 to 6, $R_2$ is a hydrogen, a hydroxy group, an alkoxy group having a carbon number 1 of 16, an alkyl group having a carbon number 1 of 12 or an alkylamine group having a carbon number of 1 to 12; and one or more hydrogen of $A_1$, $A_2$ and $A_3$ in the Formula 1 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, a heteroaryl group having a carbon number of 2 to 20, an aryloxy group having a carbon number of 6 to 20, an arylthio group having a carbon number of 6 to 20, alkoxycarbonyl group having a carbon number 1 of 12, a halogen group, a cyano group, a nitro group, a hydroxyl group and a carboxyl group.

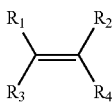

[Formula 2]

In Formula 2, $R_1$ to $R_3$ are each independently a hydrogen, a cyano group, or represented by a Formula 2-a; and

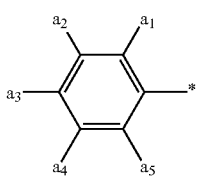

[Formula 2-a]

in Formula 2-a, $a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and $R_4$ is a hydrogen, a cyano group, or a Formula 2-b; and

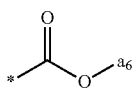

[Formula 2-b]

in Formula 2-b, $a_6$ is a hydrogen or an alkyl group having a carbon number of 1 to 18; and one or more hydrogen of $R_1$ to $R_4$ in the Formula 2 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group.

The first light absorption dye represented by Formula 1 can be represented by Formula 3 below.

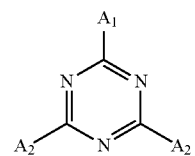

[Formula 3]

In Formula 3, $A_1$ and $A_2$ are each independently a phenyl group or a Formula 3-a; and one or more of $A_1$, $A_2$ and $A_3$ are Formula 3-a, and

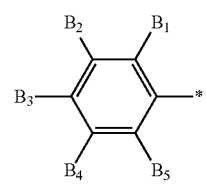

[Formula 3-a]

in Formula 3-a, $B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or Formula 3-b; and

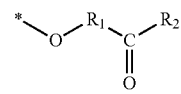

[Formula 3-b]

in Formula 3-b, $R_1$ is an alkylene having a carbon number of 1 to 6, $R_2$ is a hydrogen, a hydroxy group, an alkoxy group having a carbon number 1 of 12, an alkyl group having a carbon number 1 of 12 or an alkylamine group having a carbon number of 1 to 12.

For example, as for the explanation of the Formula 1 as to the first dye, the $A_1$, $A_2$ and $A_3$ are one of 1 to 33 structures disclosed in the following Table 1.

TABLE 1
| No. | A₁ | A₂ | A₃ |
|---|---|---|---|
| 1 | 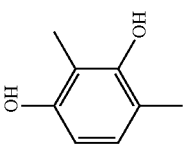 | 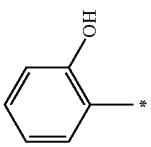 | 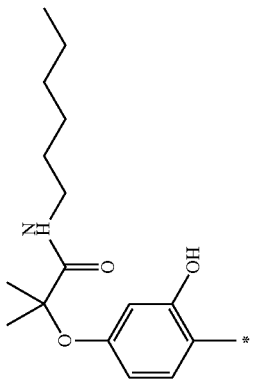 |
| 2 | 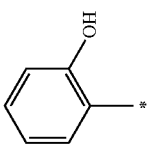 | 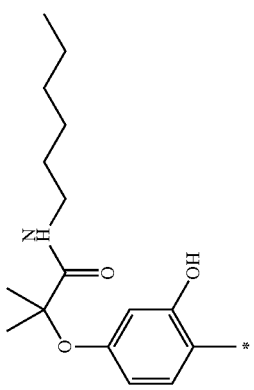 |  |
| 3 | 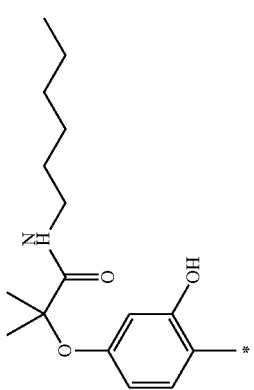 | 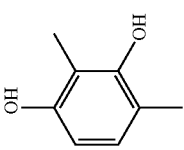 |  |
| 4 | 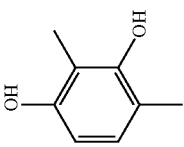 | 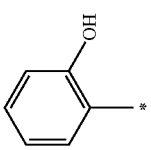 | 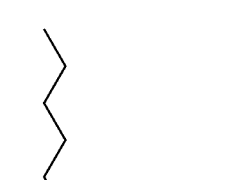 |

TABLE 1-continued

| No. | A₁ | A₂ | A₃ |
|---|---|---|---|
| 5 | | | |
| 6 | | | |
| 7 | | | |
| 8 | | | |
| 9 | | | |
| 10 | | | |

TABLE 1-continued
| No. | A₁ | A₂ | A₃ |
|---|---|---|---|
| 11 | 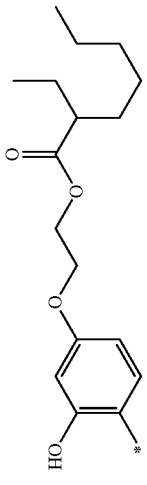 |  |  |
| 12 | 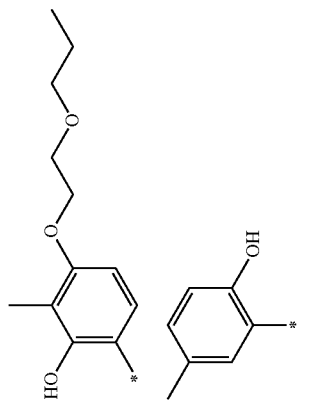 | 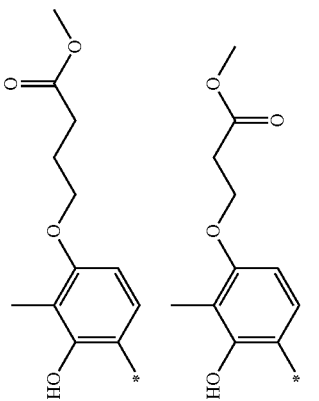 | 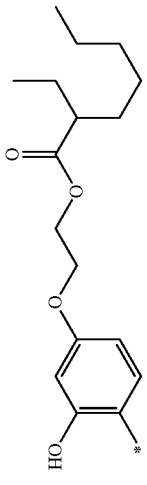 |
| 13 |  |  | 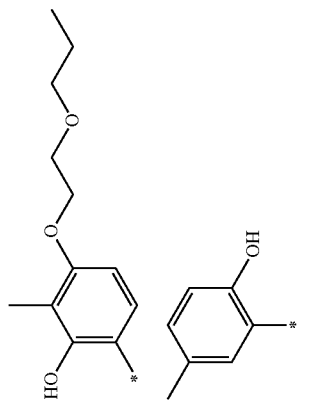 |
| 14 | 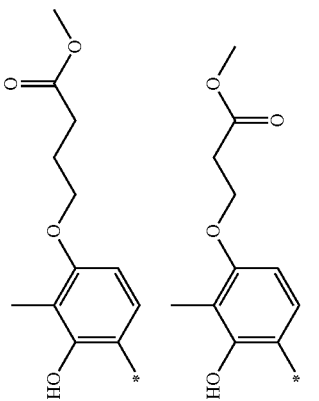 | 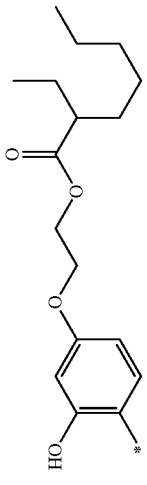 |  |
| 15 |  | 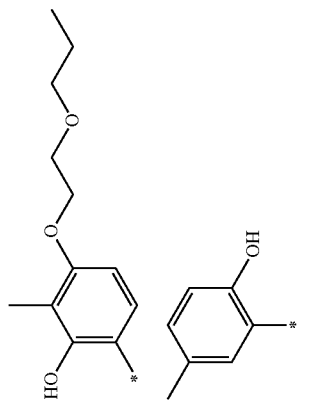 | 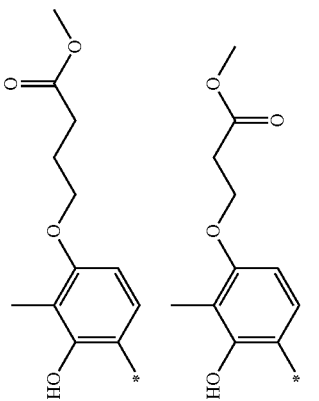 |
| 16 | 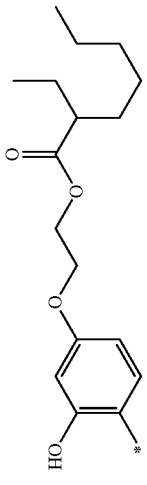 |  |  |

TABLE 1-continued

| No. | A₁ | A₂ | A₃ |
|---|---|---|---|
| 17 | | | |
| 18 | | | |
| 19 | | | |
| 20 | | | |
| 21 | | | |

TABLE 1-continued
| No. | $A_1$ | $A_2$ | $A_3$ |
|---|---|---|---|
| 22 | 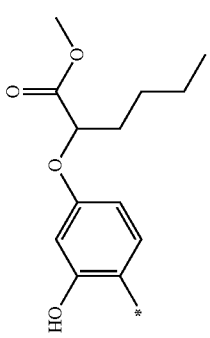 | 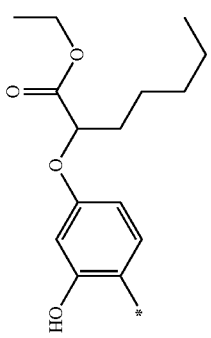 | 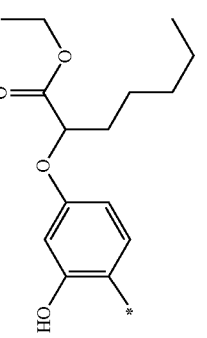 |
| 23 | | | 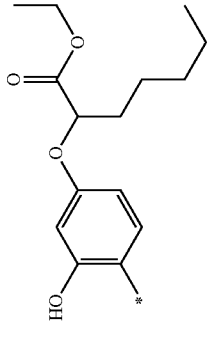 |
| 24 | | | 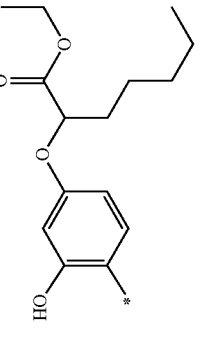 |

TABLE 1-continued

| No. | A₁ | A₂ | A₃ |
|---|---|---|---|
| 25 | | | |
| 26 | | | |
| 27 | | | |
| 28 | | | |

TABLE 1-continued
| No. | $A_1$ | $A_2$ | $A_3$ |
|---|---|---|---|
| 29 | 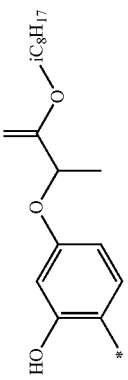 | 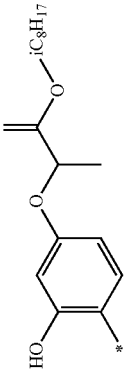 | 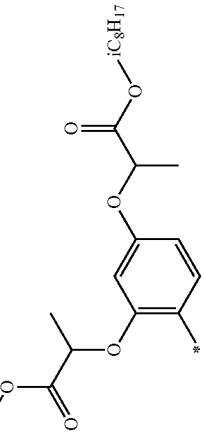 |
| 30 | 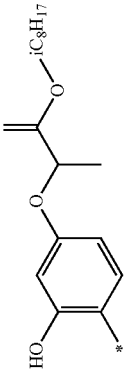 | 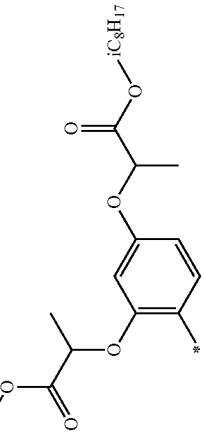 | 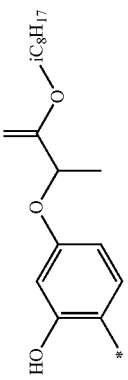 |
| 31 | 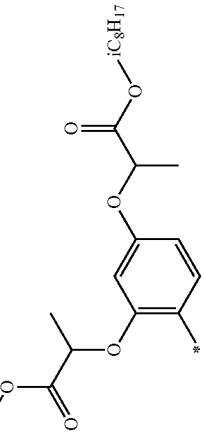 | 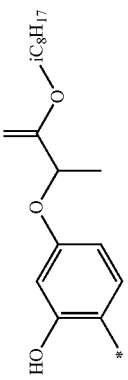 | 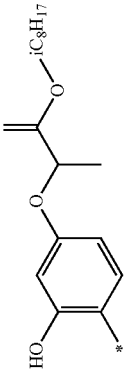 |
| 32 | 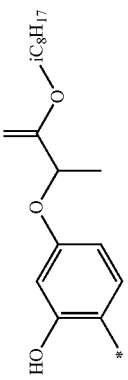 | 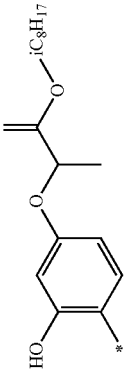 | 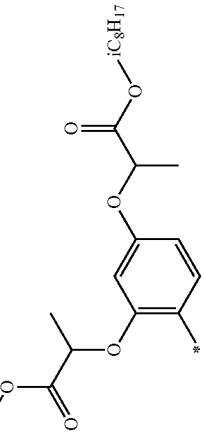 |

TABLE 1-continued
| No. | A₁ | A₂ | A₃ |
|-----|----|----|----|
| 33 | 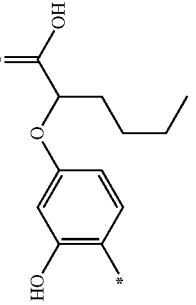 | 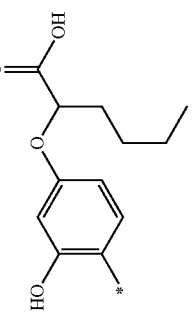 | 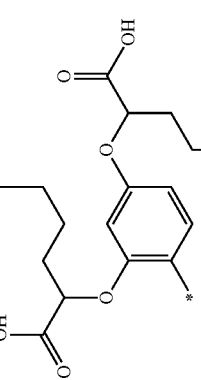 |

In addition, the second light absorption dye represented by the Formula 2 can be represented by the following Formula 4.

[Formula 4]

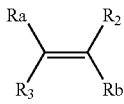

In Formula 4,
$R_2$ is a cyano group;
$R_3$ is a hydrogen; and
$R_a$ is represented to a Formula 4-a wherein

[Formula 4-a]

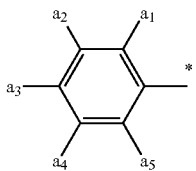

in Formula 4-a,
$a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and
$R_b$ is represented to a Formula 4-b; and

[Formula 4-b]

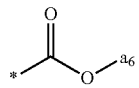

in Formula 4-b,
$a_6$ is a hydrogen or an alkyl group having a carbon number of 1 to 10; and
one or more hydrogen of $R_2$, $R_3$, $R_a$ and $R_b$ in the Formula 4 are each independently substituted or unsubstituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group.

For example, as for the explanation of the Formula 2 as to the second dye, the $R_1$ to $R_4$ include the following cases in Table 2 below.

TABLE 2

| No. | $R_1$ | $R_2$ | $R_3$ | $R_4$ |
|---|---|---|---|---|
| 1 | phenyl | —H | —H | —C(=O)O-octyl |
| 2 | biphenyl | —H | —H | —C(=O)O-octyl |
| 3 | phenyl | —CN | —CN | —C(=O)OH |
| 4 | biphenyl | —CN | —CN | —C(=O)O-isobutyl |
| 5 | phenyl | —H | —CN | —C(=O)O-isobutyl |
| 6 | biphenyl | —H | —CN | —C(=O)O-isobutyl |
| 7 | phenyl | —CN | —H | —C(=O)O-heptyl |

TABLE 2-continued
| No. | R$_1$ | R$_2$ | R$_3$ | R$_4$ |
|---|---|---|---|---|
| 8 | 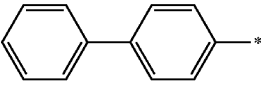 | —CN | —H | 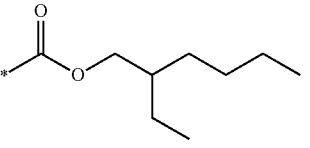 |
| 9 | 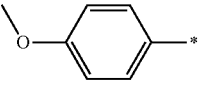 | —H | —H | 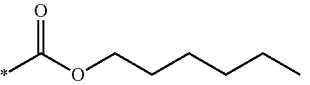 |
| 10 | 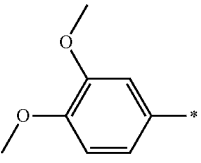 | —H | —H | 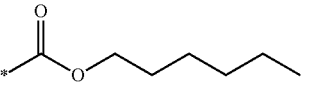 |
| 11 | 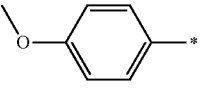 | —CN | —CN | 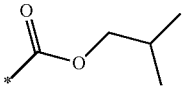 |
| 12 | 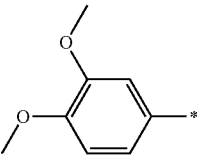 | —CN | —CN | 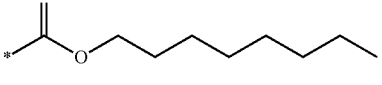 |
| 13 | 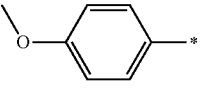 | —H | —CN | 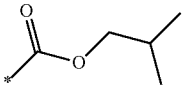 |
| 14 | 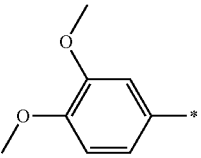 | —H | —CN | 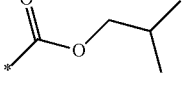 |
| 15 | 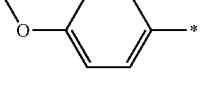 | —CN | —H | 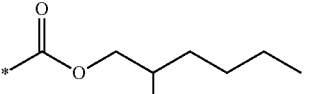 |
| 16 | 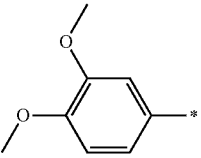 | —CN | —H | 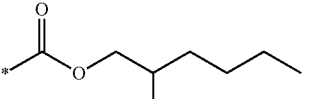 |
| 17 | 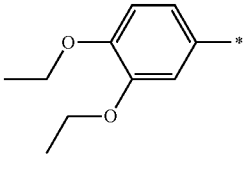 | —H | —H | 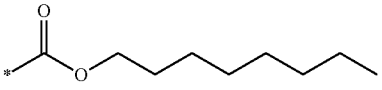 |
| 18 | 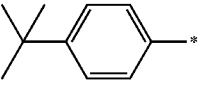 | —H | —H | 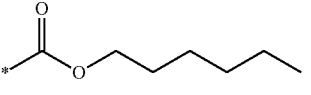 |

TABLE 2-continued

| No. | R$_1$ | R$_2$ | R$_3$ | R$_4$ |
|---|---|---|---|---|
| 19 | 3,4-diethoxyphenyl | —CN | —CN | —C(O)O-octyl |
| 20 | 4-tert-butylphenyl | —CN | —CN | —C(O)OH |
| 21 | 3,4-diethoxyphenyl | —H | —CN | —C(O)O-isobutyl |
| 22 | 4-tert-butylphenyl | —H | —CN | —C(O)O-isobutyl |
| 23 | 3,4-diethoxyphenyl | —CN | —H | —C(O)O-octyl |
| 24 | 4-tert-butylphenyl | —CN | —H | —C(O)O-hexyl |
| 25 | 4-cyclohexylphenyl | —H | —H | —C(O)O-octyl |
| 26 | 4-benzylphenyl | —H | —H | —C(O)O-hexyl |
| 27 | 4-cyclohexylphenyl | —CN | —CN | —C(O)O-octyl |
| 28 | 4-benzylphenyl | —CN | —CN | —C(O)O-(2-ethylhexyl) |

TABLE 2-continued

| No. | R₁ | R₂ | R₃ | R₄ |
|---|---|---|---|---|
| 29 | cyclohexyl-phenyl-* | —H | —CN | isobutyl ester |
| 30 | benzyl-phenyl-* | —H | —CN | isobutyl ester |
| 31 | cyclohexyl-phenyl-* | —CN | —H | hexyl ester |
| 32 | benzyl-phenyl-* | —CN | —H | octyl ester |
| 33 | 3,4-dicyanophenyl-* | —H | —H | isobutyl ester |
| 34 | 3-pyridyl-phenyl-* | —H | —H | hexyl ester |
| 35 | 3,4-dicyanophenyl-* | —CN | —CN | 2-ethylhexyl ester |
| 36 | 3-pyridyl-phenyl-* | —CN | —CN | 2-ethylhexyl ester |
| 37 | 3,4-dicyanophenyl-* | —H | —CN | isobutyl ester |
| 38 | 3-pyridyl-phenyl-* | —H | —CN | isobutyl ester |

TABLE 2-continued
| No. | R₁ | R₂ | R₃ | R₄ |
|---|---|---|---|---|
| 39 | 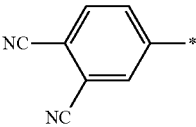 | —CN | —H | 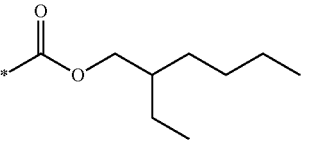 |
| 40 | 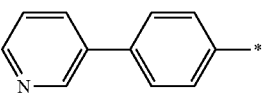 | —CN | —H | 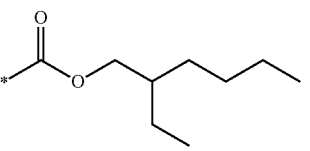 |
| 41 | 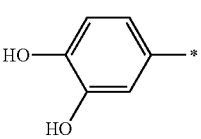 | —H | —H | 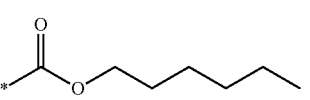 |
| 42 | 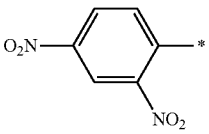 | —H | —H | 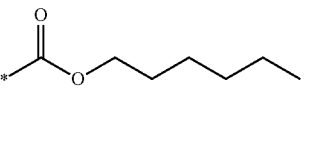 |
| 43 | 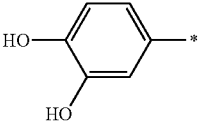 | —CN | —CN | 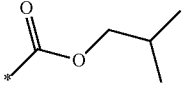 |
| 44 | 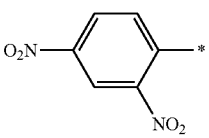 | —CN | —CN | 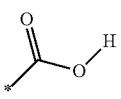 |
| 45 | 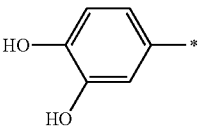 | —H | —CN | 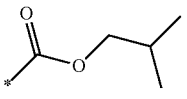 |
| 46 | 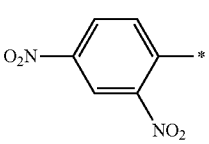 | —H | —CN | 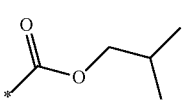 |
| 47 | 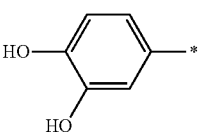 | —CN | —H | 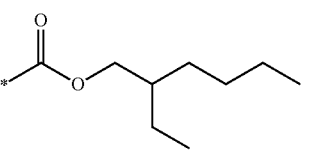 |
| 48 | 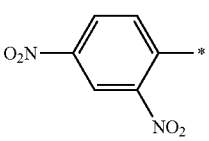 | —CN | —H | 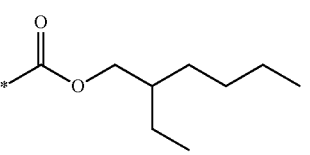 |

TABLE 2-continued
| No. | R₁ | R₂ | R₃ | R₄ |
|---|---|---|---|---|
| 49 | 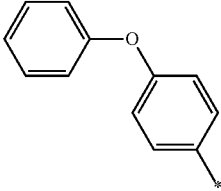 | —H | —H | 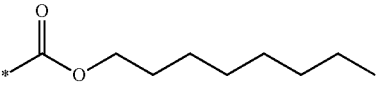 |
| 50 | 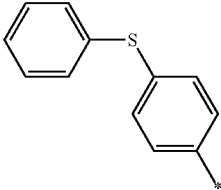 | —H | —H | 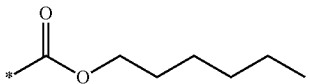 |
| 51 | 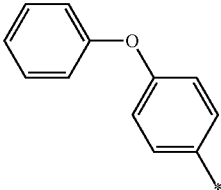 | —CN | —CN | 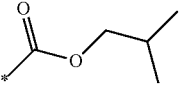 |
| 52 | 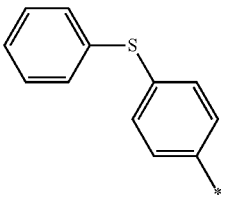 | —CN | —CN | 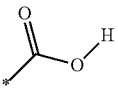 |
| 53 | 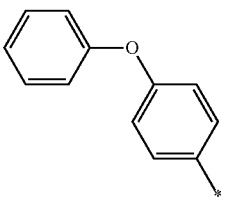 | —H | —CN | 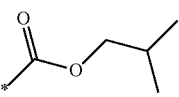 |
| 54 | 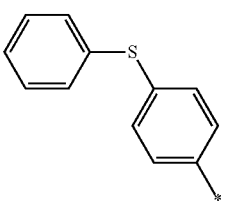 | —H | —CN | 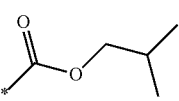 |
| 55 | 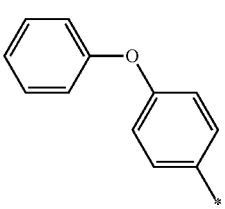 | —CN | —H | 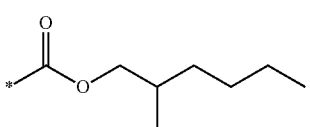 |

TABLE 2-continued

| No. | R₁ | R₂ | R₃ | R₄ |
|---|---|---|---|---|
| 56 | (phenyl-S-phenyl-*) | —CN | —H | *—C(=O)—O—(octyl) |

In another embodiment, the amount of the light absorption dye dispersed in the binder resin can be 90 parts by weight or less with a reference to 100 parts by weight of the adhesive binder resin in the adhesive composition according to the present invention. More specifically, the amount of the light absorption dye can be in the range of 3 to 90 parts by weight, 4 to 87 parts by weight, 5 to 75 parts by weight, 50 to 90 parts by weight, or 55 to 87 parts by weight. By controlling the amount of the light absorption dye within the range stated above, light can be effectively and selectively blocked in the ultraviolet region without deteriorating the transmittance with respect to the visible light region. On the other hand, if the amount of the light absorption dye dispersed in the binder resin is too high, the adhesion strength of the adhesive sheet is lowered and if the amount of the light absorption dye is extremely low, the transmittance in 400-430 nm range is increased and thereby there is a problem of not effectively blocking the light in the ultraviolet region.

In one embodiment, a mixing rate of the first light absorption dye and the second light absorption dye according to the present application can be in the range of 1:99 to 99:1 weight ratio. Specifically, the mixing ratio of the first light absorption dye and the second light absorption dye can be in the range of 1:3 to 99:1 weight ratio, 1:2 to 99:1 weight ratio, or 1:1 to 99:1 weight ratio. By mixing the amount of the two light absorption dyes as stated range above, the present invention can selectively and effectively block the light in the ultraviolet region without deteriorating the transmittance with respect to the visible light region.

In addition, the adhesive composition according to the present invention may further include a particulate component dispersed in a binder resin. Specifically, the particulate component may have an average refractive index in the range of 1.3 to 2.1 or 1.4 to 1.6. It is not particularly limited as long as the particulate component has the refractive index as stated and for example, it may include one or more species of metal particles selected from a group consisted of metal oxide, metal nitride and metal oxynitride; one or more species of organic particles selected from a group consisted of silicone and acryl resin; and one or more of organic-inorganic particles containing a component consisting the metal particle and a component consisting the organic particle.

For example, the metal particles can be one or two or more of mixture of an alloy phase of Zr, Al, Fe, Cu, Ti, Au, Ag, Mg and Zn and they include their respective metal oxide, metal nitride and/or metal oxynitride. For example, the organic particles can be silicone particles or acryl resin particles with the bead type. Moreover, it also does not exclude the organic-inorganic particles containing a component consisting of the metal particle and a component consisting of the organic particle. For example, the particulate component can be at least one or more from $ZrO_2$, $TiO_2$, $Al_2O_3$, MgO, and $SiO_2$ and the shape of particle can be spherical or a variety of polygonal shapes.

For the particulate component, for example, the average diameter of the particulate component may be in the range of 0.1 to 5 μm, 0.5 to 3 μm, 3 to 5 μm, or 2 to 4 μm. The average diameter of the particulate component stated above considers the possibility of the deterioration of the value of the refractive index and the transmittance in the visible light region.

When it includes the particulate component having the average diameter range as stated above, it can scatter to all directions by maximizing the Mie Scattering and as a result, it can reduce the color shift phenomena causing the color distortion with respect to the display device viewing angle since it can reduce the light straightness as to a certain wavelength.

In addition, the refractive index difference between the particulate component and the binder resin may be 0.05 or more. Specifically, it can be in the range of 0.05 to 0.4, 0.07 to 0.3, or 0.08 to 0.15. By designing for retractive index between the particulate component and the binder resin to have a certain degree or more of the difference, it has the effect of increasing the light transparency in the visible light region.

The binder resin contained in the adhesive composition according to the present invention is not particularly limited as long as it is an adhesive resin, and as examples for this, it can use acryl resin, rubber resin, vinyl resin, silicone resin, polyester resin, polyamide resin, urethane resin, fluorine resin, epoxy resin, or two or more kinds of the mixture of the resins mentioned above. Among them, the acryl resin can be used for the aspect of its weather resistance, the cost, and the degree of freedom of formation for the adhesive.

In addition, the present invention provides a display device including an adhesive layer formed of the previously described adhesive composition or the adhesive sheet. Below, the display device and its relating multilayer structure will be explained, but it will be referred as the "adhesive layer" for the convenience of totally including the adhesive layer formed of the adhesive composition or the adhesive sheet as mentioned above.

As for an example, the display device is a structure where a display panel, a polarizing film, a touch film, and a light transparent optical window layer are sequentially stacked, and the adhesive layer can be a structure
where it is formed in one or more positions
between the display panel and the polarizing film;
inside the polarizing film;
between the polarizing film and touch film; and
between the touch film and the light transparent optical window layer.

As for another example, the display device display panel is a structure where a display panel, a polarizing film, a touch film, and a light transparent optical window layer are sequentially stacked, and
the adhesive layer can be a structure
where it is formed in one or more positions
between display panel and touch film;
between the touch film and the polarizing film;
inside the polarizing film; and
between the polarizing film and the light transparent optical window layer.

The polarizing film can be a multilayer structure including a polarizer and a retardation film, etc. In addition, since the adhesive layer is located between the polarizer and the display panel, it is possible to effectively block light in the ultraviolet region without deteriorating the performance of the display device. The adhesive layer is located between the display panel and the polarizer and more specifically, it can be located between one or more surfaces of each layer for a case where there exist many optical layers between the display device and the polarizer.

Specifically, the display device comprises a display panel; a polarizing film; a touch film; and a light transparent optical window layer,
the polarizing film is a multilayer structure including a polarizer, and
the adhesive layer can be a structure where it is formed between the polarizer and the display panel.

Here, the display device includes cases of a structure where a display panel, a polarizing film, a touch film, and a light transparent optical window layer are sequentially stacked; or a structure where a display panel, a touch film, a polarizing film, and a light transparent optical window layer are sequentially stacked.

In addition, the display device, for example, can be an OLED device. It is appropriate for a recent trend where a demand for a mobile application adapting an OLED device is increased. The display device according to the present invention can selectively block light in the ultraviolet region and it can effectively prevent the color change or the color temperature change due to the sunlight exposure.

The display device can be applied to various types of display devices and for example, it can be applied to a TV, a monitor, a cell phone, a navigation, a notebook, or a tablet PC, etc., and specifically, it can be applied to a mobile device. Furthermore, the display device according to the present invention includes all the cases where it comprises the adhesive layer, the adhesive sheet or the multilayer structure formed of the adhesive composition as stated above.

Below, the present invention will be explained in more detail with reference to the drawings. However, the explanation as to the drawings below is only for to exemplify the present invention, thus the content of the present invention is not limited to the explanation.

Figure 2:
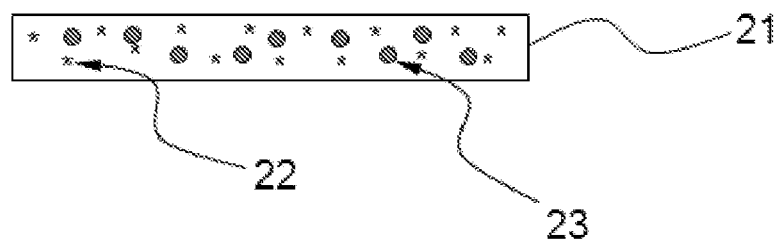
FIG. 2 is a schematic diagram disclosing a cross-section of an adhesive sheet according to another embodiment of the present invention.

FIG. 1 is a structure for an adhesive sheet (10) according to one embodiment of the present invention where a light absorption dye (12) is dispersed in a binder resin (11). FIG. 2 is a structure for an adhesive sheet (20) according to another embodiment of the present invention where a light absorption dye (22) and a particulate component (23) are dispersed in a binder resin (21) together.

Figure 3:
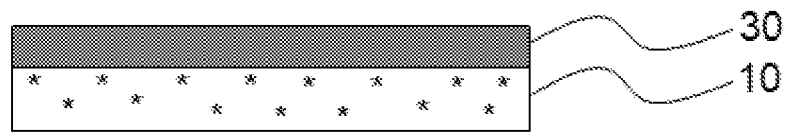
FIGS. 3 and 4 are schematic diagrams disclosing cross-sections of adhesive sheets attached with release films according to one embodiment of the present invention.
Figure 4:
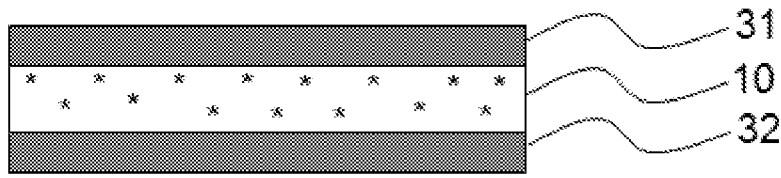

FIG. 3 is for disclosing a multilayer structure of the adhesive sheet (10) according to the present invention and it is a structure where a release film (30) is stacked on a side of the adhesive sheet (10) where the light absorption dye is dispersed. Or, as disclosed in FIG. 4, it also includes a structure where release films (31, 32) are stacked on both sides of the adhesive sheet (10). In a manufacturing process of a display device applying the adhesive sheet according to the present invention, the release films (30, 31, 32) formed on one side or both sides of the adhesive sheet can be removed by the process step.

Figure 5:
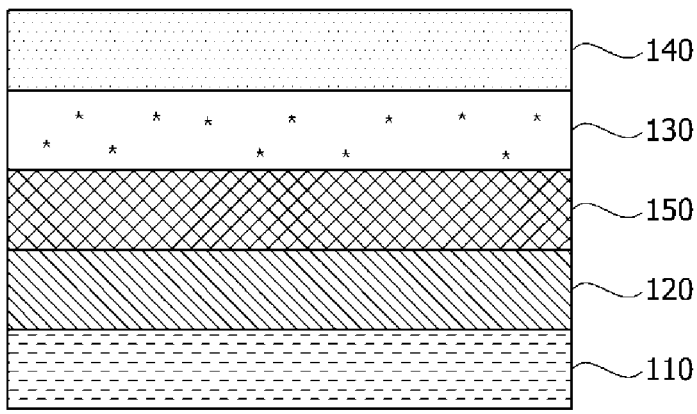
FIGS. 5 to 7 are schematic diagrams disclosing cross-sections of display devices according to one embodiment of the present invention.

FIG. 5 is a schematic diagram disclosing a cross-section of a display device (100) according to one embodiment of the present invention. In FIG. 5, the display device (100) is a structure where a polarizing film (120), a touch film (150), an adhesive layer (130), and a window layer (140) are sequentially stacked on an OLED panel (110). The adhesive layer (130) is a structure where the light absorption dye is dispersed inside and it also can be a structure where the particulate component is dispersed together although it is not disclosed. Moreover, the touch film (150) can detect touching when an object is approaching to the touch film (150) or contacts to the touch film (150). Here, the "contact" includes not only a case where a foreign object such as a user's hand directly contacts to the touch film (15) but also a case where the foreign object is approaching to the touch film (150) or is moving while approaching.

Figure 6:
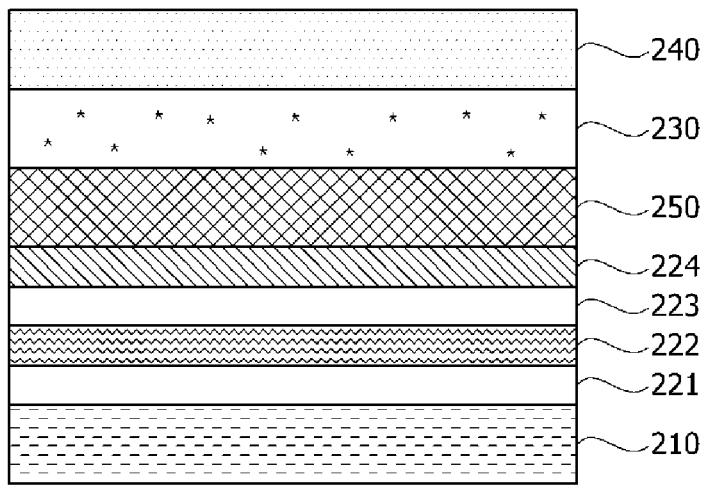

FIG. 6 is a schematic diagram disclosing a cross-section of a display device (200) according to another embodiment of the present invention. In FIG. 6, the display device (200) is a structure where a first adhesive layer (221), a polarizing film, a touch film (250), a third adhesive layer (230), and a window layer (240) are sequentially stacked on an OLED panel (210). The window layer (240) can use a light transparent plastic or a glass substrate. The polarization film is a structure where a retardation film (222), a second adhesive layer (223) and a polarizer (224) are sequentially stacked. In summary, the display device disclosed in FIG. 6 comprises the first adhesive layer (221) formed between the OLED panel (210) and the retardation film (222); the second adhesive layer (223) formed between the retardation film (222) and the polarizer (224); and the third adhesive layer (230) formed between the polarizer (224) and the window layer (240) and one or more of the first to third adhesive layers (221, 223, 230) may include the light absorption dyes dispersed inside. Depending on the cases, one or more layers of the first to third adhesive layer (221, 223, 230) can include the light absorption dye or two layers or three layers can all include the light absorption dye.

Figure 7:
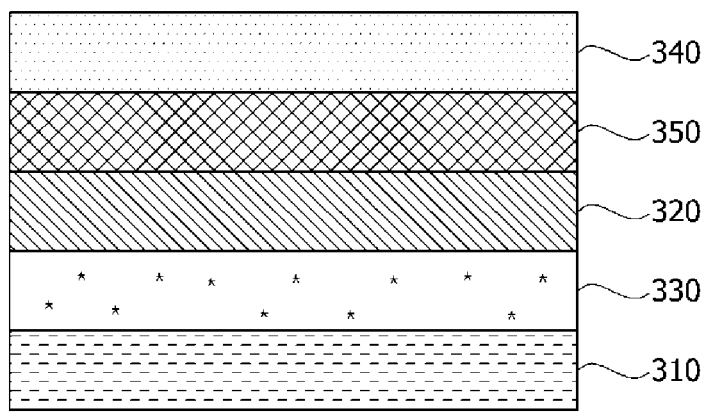

FIG. 7 is a schematic diagram disclosing a cross-section of a display device (300) according to one embodiment of the present invention. In FIG. 7, the display device (300) is a structure where an adhesive layer (330), a polarizing film (320), a touch film (350), and a window layer (340) are sequentially stacked on an OLED panel (310). The adhesive layer (330) is a structure where the light absorption dye is dispersed inside and it also can be a structure where the particulate component is dispersed together although it is not disclosed.

Below, the present invention will be explained in more detail by the embodiments and the experimental examples.

However, the embodiments and the experimental examples are only examples for disclosing the present invention, thus the content of the present invention is not limited to the embodiments and the experimental examples.

Preparation Example 1: The Preparation of the First Light Absorption Dye

A dye having the following chemical structure was used for the first light absorption dye.

Preparation Example 1-1

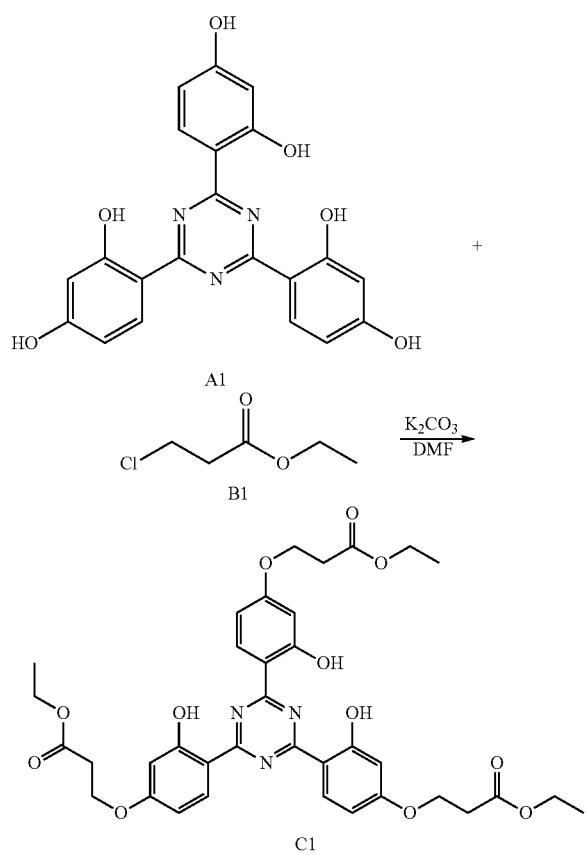

Into a 250 ml three-necked round bottom flask, DMF (20 ml) was injected, and Chemical Formula A1 (10.0 g, 0.0247 mol) and Chemical Formula B1 (10.7 g, 0.0789 mol) was added. Potassium carbonate ($K_2CO_3$, 3.4 g) was added and heated to 120° C. to reflux for 3 hours. EA (ethyl acetate, 100 ml) and water was added to the reaction mixture to wash. The solvent was removed and the desired compound (Formula C1, 15.7 g, yield rate: 90.13%) was obtained.

MALDI-TOF: m/z=705.71 ($C_{36}H_{39}N_3O_{12}$=705.25)

Preparation Example 1-2

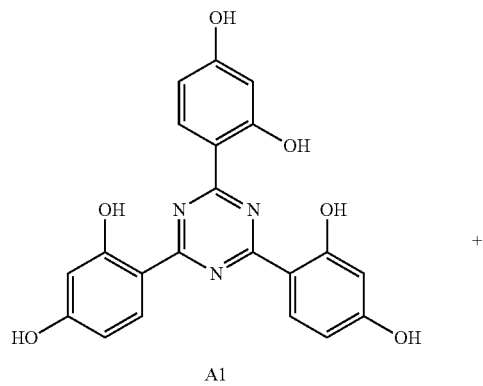

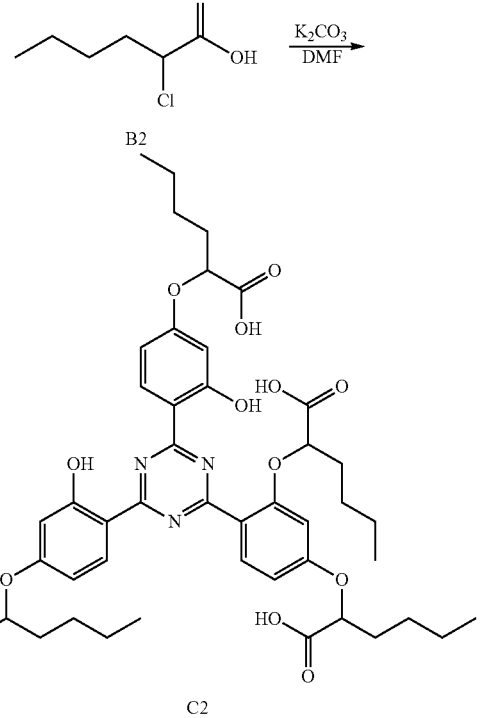

Into a 250 ml three-neck round bottom flask, DMF (20 ml) was injected, and Chemical Formula A1 (10.0 g, 0.0247 mol) and Chemical Formula B2 (15.5 g, 0.1037 mol) was added. Potassium carbonate ($K_2CO_3$, 3.4 g) was added and heated to 120° C. to reflux for 6 hours. EA (ethyl acetate, 100 ml) and water was added to the reaction mixture to wash. The solvent was removed and the desired compound (Formula C2, 18.3 g, yield rate: 86.00%) was obtained.

MALDI-TOF: m/z=861.93 ($C_{45}H_{55}N_3O_{14}$=861.37)

Preparation Example 1-3

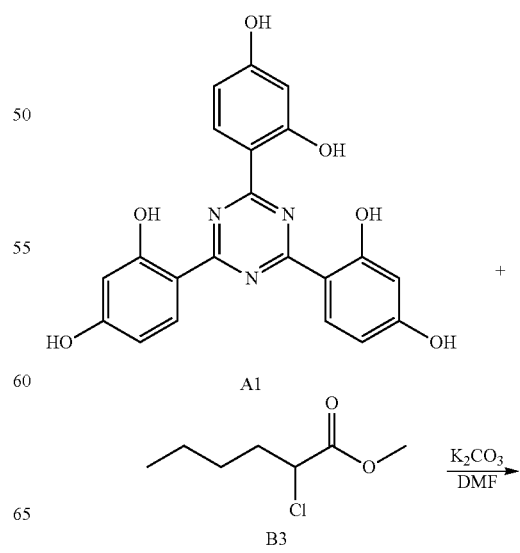

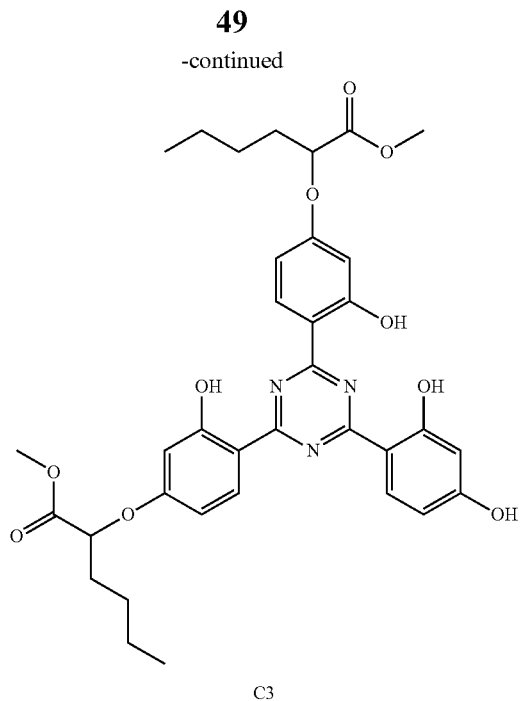

C3

Into a 250 ml three-necked round bottom flask, DMF (20 ml) was injected, and Formula A1 (10.0 g, 0.0247 mol) and Formula B3 (8.9 g, 0.0542 mol) was added. Potassium carbonate ($K_2CO_3$, 3.4 g) was added and heated to 120° C. to reflux for 2 hours. EA (ethyl acetate, 100 ml) and water was added to the reaction mixture to wash. The solvent was removed and the desired compound (Formula C3, 15.2 g, yield rate: 93.29%) was obtained.

MALDI-TOF: m/z=661.71 ($C_{35}H_{39}N_3O_{10}$=661.26)

Preparation Example 1-4

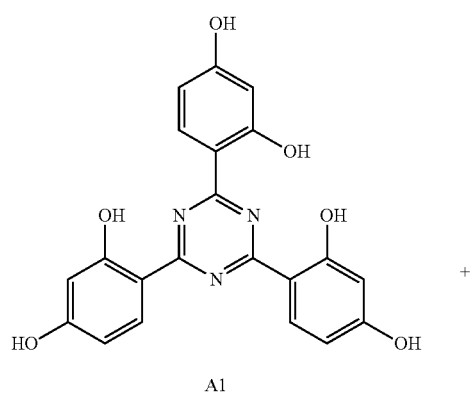

A1

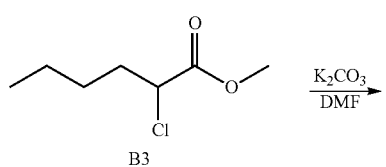

B3

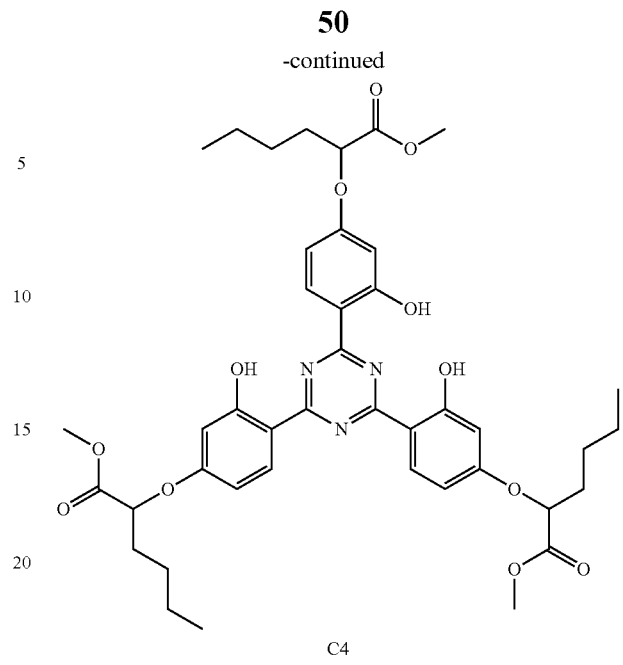

C4

Into a 250 ml three-neck round bottom flask, DMF (20 ml) was injected, and Chemical Formula A1 (10.0 g, 0.0247 mol) and Chemical Formula B3 (12.9 g, 0.0789 mol) was added. Potassium carbonate ($K_2CO_3$, 3.4 g) was added and heated to 120° C. to reflux for 3 hours. EA (ethyl acetate, 100 ml) and water was added to the reaction mixture to wash. The solvent was removed and the desired compound (Formula C4, 17.9 g, yield rate: 91.75%) was obtained.

MALDI-TOF: m/z=789.87 ($C_{42}H_{51}N_3O_{12}$=789.35)

Preparation Example 1-5

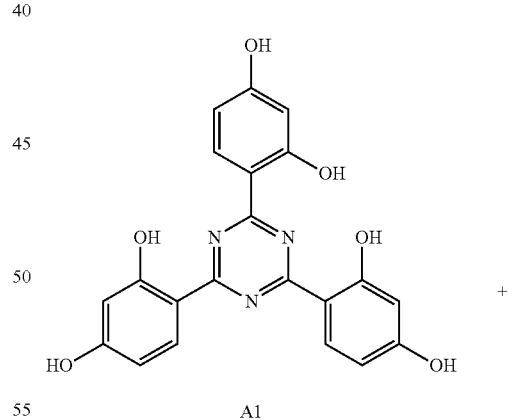

A1

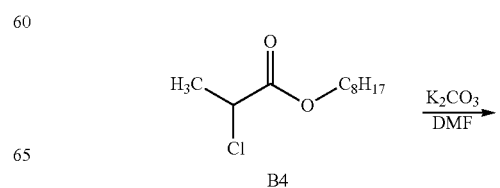

B4

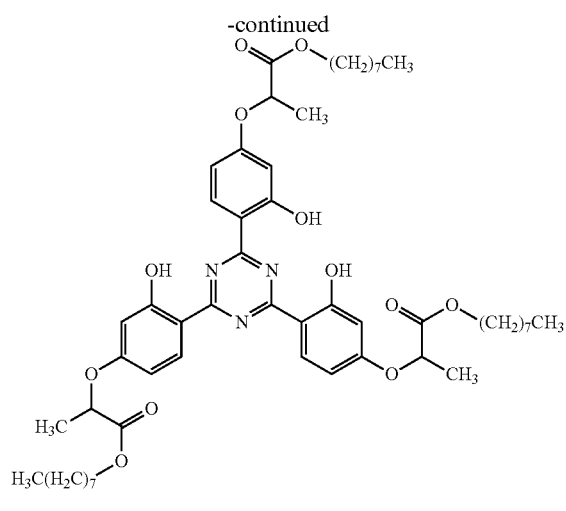

C5

Into a 250 ml three-necked round bottom flask, DMF (20 ml) was injected, and Formula A1 (10.0 g, 0.0247 mol) and Formula B4 (17.4 g, 0.0789 mol) was added.

Potassium carbonate ($K_2CO_3$, 3.4 g) was added and heated to 120° C. to reflux for 3 hours. EA (ethyl acetate, 100 ml) and water was put to the reaction mixture to wash. The solvent was removed and the desired compound (Formula C5, 20.4 g, yield rate: 86.45%) was obtained.

MALDI-TOF: m/z=958.47 ($C_{54}H_{75}N_3O_{12}$=958.19)

Preparation Example 1-6

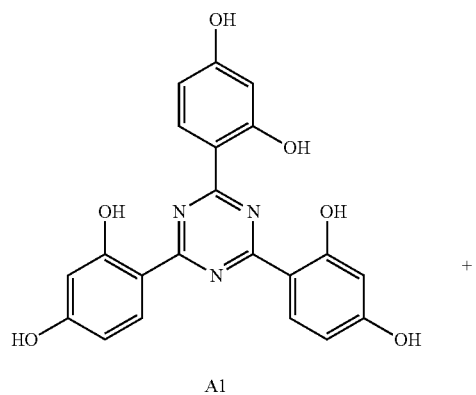

A1

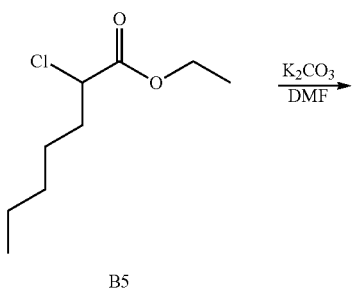

B5

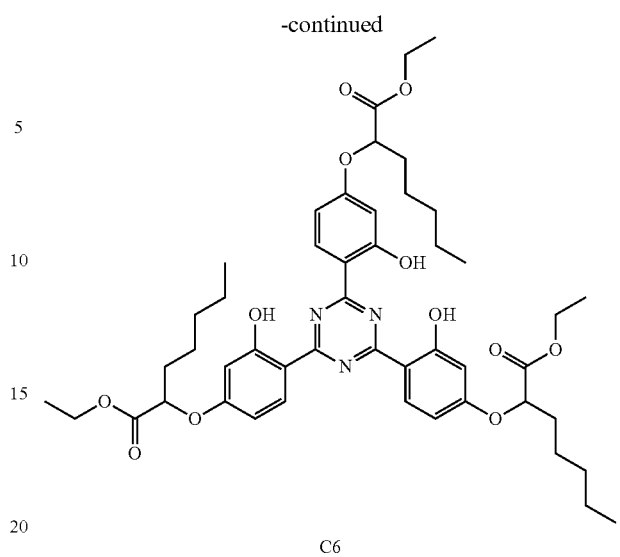

C6

Into a 250 ml three-necked round bottom flask, DMF (20 ml) was injected, and Formula A1 (10.0 g, 0.0247 mol) and Formula B5 (15.2 g, mol) was added. Potassium carbonate ($K_2CO_3$, 3.4 g) was added and heated to 120° C. to reflux for 3 hours. EA (ethyl acetate, 100 ml) and water was added to the reaction mixture to wash. The solvent was removed and the desired compound (Formula C6, 19.3 g, yield rate: 89.48%) was obtained.

MALDI-TOF: m/z=874.03 ($C_{48}H_{63}N_3O_{12}$=873.44)

Preparation Example 2: The Preparation of the Second Light Absorption Dye

A dye having the following chemical structure was used for the second light absorption dye.

Preparation Example 2-1

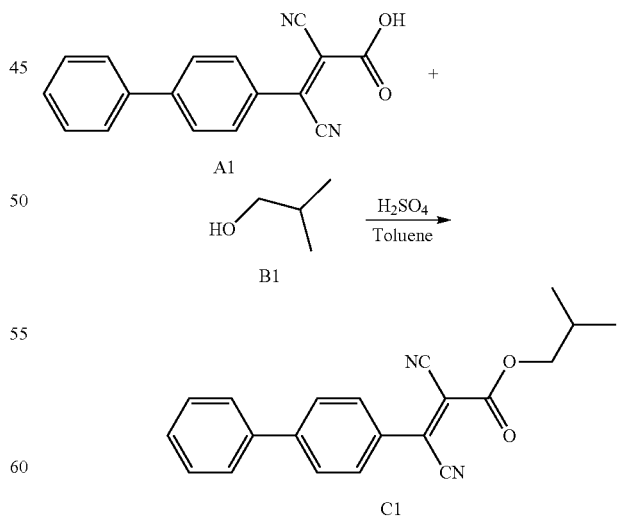

Into a 250 ml three-necked round bottom flask, a Soxhlet was established and then, toluene (24 ml) was injected and Formula A1 (18.0 g, 0.065 mol) and Formula B1 (21.9 g, 0.295 mol) was added. After heating to 40° C., sulfuric acid ($H_2SO_4$, 1.2 g) was added and heated to 120° C. to reflux for 12 hours. Ether (41 ml) and sodium bicarbonate solution (49 ml) was put to the reaction mixture to separate the organic layer. The organic layer was washed with distilled water and the solvent was removed and the desired compound (Formula C1, 17.8 g, yield rate: 82%) was obtained.

MALDI-TOF: m/z=330.1368 ($C_{21}H_{18}N_2O_2$=330.1)

Preparation Example 2-2

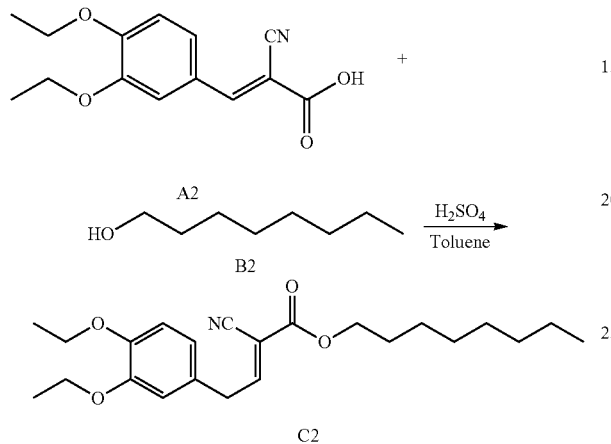

Into a 250 ml three-necked round bottom flask, a Soxhlet was established and then, toluene (26 ml) was injected and Formula A2 (19.0 g, 0.072 mol) and Formula B2 (42.6 g, 0.327 mol) were added. After heating to 40° C., sulfuric acid ($H_2SO_4$, 1.4 g) was added and heated to 120° C. to reflux for 15 hours. Ether (44 ml) and sodium bicarbonate solution (51 ml) was put to the reaction mixture to separate the organic layer. The organic layer was washed with distilled water and the solvent was removed and the desired compound (Formula C2, 20.9 g, yield rate: 80%) was obtained.

MALDI-TOF: m/z=373.2253 ($C_{21}H_{31}NO_4$=373.2)

Preparation Example 2-3

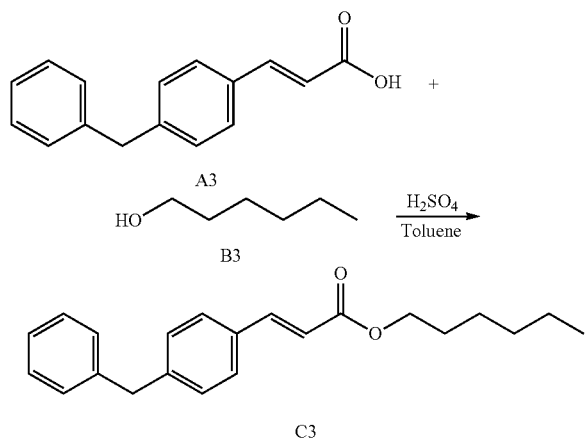

Into a 250 ml three-necked round bottom flask, a Soxhlet was established and then, toluene (27 ml) was injected and Formula A3 (20.0 g, 0.083 mol) and Formula B3 (38.6 g, 0.377 mol) were added. After heating to 40° C., sulfuric acid ($H_2SO_4$, 1.6 g) was added and heated to 120° C. to reflux for 12 hours. Ether (46 ml) and sodium bicarbonate solution (54 ml) was put to the reaction mixture to separate the organic layer. The organic layer was washed with distilled water and the solvent was removed and the desired compound (Formula C3, 23.0 g, yield rate: 85%) was obtained.

MALDI-TOF: m/z=322.1933 (C22142602=322.2)

Preparation Example 2-4

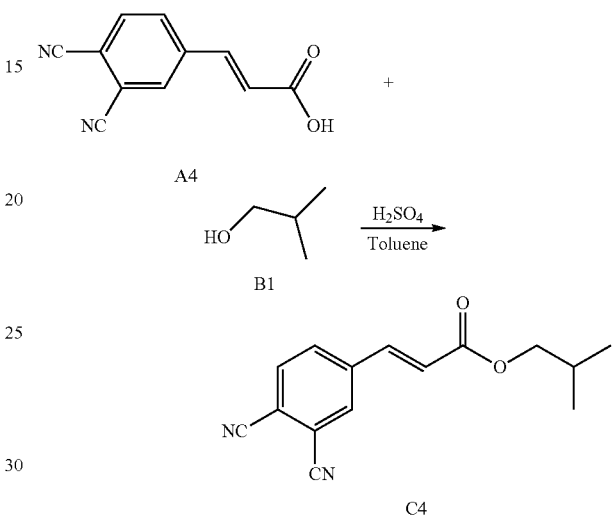

Into a 250 ml three-necked round bottom flask, a Soxhlet was established and then, toluene (26 ml) was injected and Formula A4 (19.0 g, 0.072 mol) and Formula B4 (42.6 g, 0.327 mol) were added. After heating to 40° C., sulfuric acid ($H_2SO_4$, 1.4 g) was added and heated to 120° C. to reflux for 15 hours. Ether (44 ml) and sodium bicarbonate solution (51 ml) was put to the reaction mixture to separate the organic layer. The organic layer was washed with distilled water and the solvent was removed and the desired compound (Formula C4, 20.9 g, yield rate: 80%) was obtained.

MALDI-TOF: m/z=254.1055 ($C_{15}H_{14}N_2O_2$=254.1).

Production Example 2-5

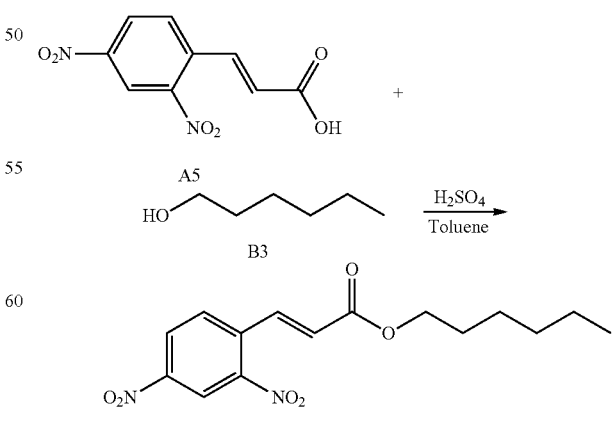

Into a 250 ml three-necked round bottom flask, a Soxhlet was established and then, toluene (26 ml) was injected and Formula A5 (19.0 g, 0.072 mol) and Formula B5 (42.6 g, 0.327 mol) were added. After heating to 40° C., sulfuric acid ($H_2SO_4$, 1.4 g) was added and heated to 120° C. to reflux for 15 hours. Ether (44 ml) and sodium bicarbonate solution (51 ml) was put to the reaction mixture to separate the organic layer. The organic layer was washed with distilled water and the solvent was removed and the desired compound (Formula C5, 20.9 g, yield rate: 80%) was obtained.

MALDI-TOF: m/z=322.1165 ($C_{15}H_{18}N_2O_6$=322.1)

Production Example 2-6

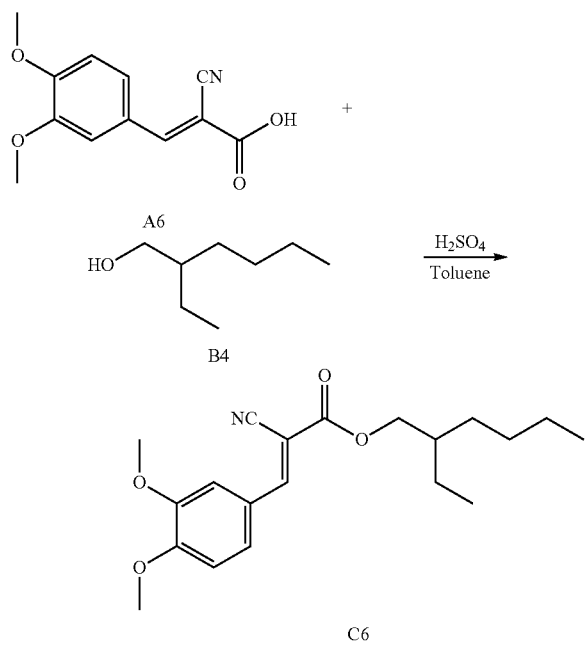

Into a 250 ml three-necked round bottom flask, a Soxhlet was established and then, toluene (26 ml) was injected and Formula A6 (19.0 g, 0.072 mol) and Formula B6 (42.6 g, 0.327 mol) were added. After heating to 40° C., sulfuric acid ($H_2SO_4$, 1.4 g) was added and heated to 120° C. to reflux for 15 hours. Ether (44 ml) and sodium bicarbonate solution (51 ml) was put to the reaction mixture to separate the organic layer. The organic layer was washed with distilled water and the solvent was removed and the desired compound (Formula C6, 20.9 g, yield rate: 80%) was obtained.

MALDI-TOF: m/z=345.1940 ($C_{20}H_{27}NO_4$=345.2)

Embodiments 1 to 5: Preparation of the Adhesive Sheet

The adhesive composition was prepared by dispersing the first light absorption dye according to the Preparation Example 1-1 and the second light absorption dye according to the Preparation Example 2-2 in the binder resin.

The adhesive compositions in the Embodiments 1 to 5 were prepared with the compositions disclosed in Table 3 below by varying the amount of each light absorption dye. The adhesive sheet having a thickness of 18 μm was prepared by depositing the uniformly mixed compositions mentioned above on the transparent substrate.

Comparative Examples 1 to 3: Preparation of Adhesive Sheet

The adhesive sheet was prepared by using the first light absorption dye alone with the same process as the Embodiment 1.

Comparative Examples 4 to 6: Preparation of Adhesive Sheet

The adhesive sheet was prepared by using the second light absorption dye alone with the same process as the Embodiment 1.

In the embodiments and the comparative examples, the adhesive sheet was prepared by the ratio of the amount of the light absorption dye and the binder resin with the compositions disclosed in Table 3 below.

TABLE 3

| No. | The First Light Absorption Dye Amount (Parts by Weight) | The Second Light Absorption Dye Amount (Parts by Weight) | Binder Resin Amount (Parts by Weight) |
|---|---|---|---|
| Comparative Example 1 | 30 | — | 70 |
| Comparative Example 2 | 35 | — | 65 |
| Comparative Example 3 | 42 | — | 58 |
| Comparative Example 4 | — | 11 | 89 |
| Comparative Example 5 | — | 24 | 76 |
| Comparative Example 6 | — | 28 | 72 |
| Example 1 | 9 | 37 | 54 |
| Example 2 | 14 | 27 | 59 |
| Example 3 | 18 | 22 | 60 |
| Example 4 | 22 | 14 | 64 |
| Example 5 | 35 | 3 | 62 |

Experimental Example: Measurement of Transmittance, Color Temperature Change and Adhesion Strength of Adhesive Sheet The transmittance, the color temperature change, and the adhesion strength with respect to 405 to 550 nm wavelength light region was measured to the adhesive sheet prepared by the Comparative Examples 1 to 6 and the prepared adhesive sheet prepared by the Embodiments 1 to 5.

The color temperature change of the adhesive sheet was measured by performing an experiment repeating a process where the adhesive sheet was exposed for 8 hours with the sunlight irradiation condition (using a Xenon lamp) under ° C. temperature and then it was exposed for 8 hours with the sunlight cut-off condition for 45 times and measuring the amount change of the one before the sunlight irradiation and after the sunlight irradiation.

The adhesion strength of the adhesive sheet was measured by measuring the peeling strength (peeling speed of 300 mm/min, peeling angle of 180°) of a standard specimen which was laminated on a PET film and then left for 30 minutes using a Universal Tensile Testing Machine (UTM).

The experimental results are shown in Table below.

TABLE 4

| No. | Binder Amount (Parts by Weight) | Dye Amount (Parts by Weight) First Dye | Dye Amount (Parts by Weight) Second Dye | 405 nm | 410 nm | 420 nm | 430 nm | 440 nm | 450 nm | 550 nm | Color Temperature Change (K) | Adhesion Strength (gf/inch) |
|---|---|---|---|---|---|---|---|---|---|---|---|---|
| Comp. Expl. 1 | 70 | 30 | — | 7.8 | 29.1 | 71.4 | 92.3 | 97.3 | 99.2 | 100.6 | 359 | 410 |
| Comp. Expl. 2 | 65 | 35 | — | 1.2 | 6.9 | 69.1 | 90.5 | 97.2 | 99.2 | 100.4 | 299 | 433 |
| Comp. Expl. 3 | 58 | 42 | — | — | — | — | — | — | — | — | — | — |
| Comp. Expl. 4 | 89 | — | 11 | 7.4 | 30.9 | 81.7 | 96.2 | 99.3 | 100.1 | 100.5 | 372 | 399 |
| Comp. Expl. 5 | 76 | — | 24 | 0.4 | 7.5 | 60.4 | 91.7 | 98.5 | 100.1 | 100.8 | 303 | 376 |
| Comp. Expl. 6 | 72 | — | 28 | 0.1 | 4.2 | 52.8 | 87.6 | 97.0 | 99.0 | 100.0 | 256 | 350 |
| Emb. 1 | 54 | 9 | 37 | — | — | — | — | — | — | — | — | — |
| Emb. 2 | 59 | 14 | 27 | 0.1 | 3.4 | 40.4 | 77.9 | 91.5 | 96.1 | 99.3 | 173 | 376 |
| Emb. 3 | 60 | 18 | 22 | 0.3 | 4.1 | 42.5 | 81.0 | 92.5 | 95.9 | 99.5 | 180 | 413 |
| Emb. 4 | 64 | 22 | 14 | 0.2 | 3.7 | 45.0 | 81.9 | 93.1 | 98.0 | 99.2 | 196 | 435 |
| Emb. 5 | 62 | 35 | 3 | 0.1 | 3.9 | 51.7 | 87.4 | 96.8 | 99.3 | 100 | 255 | 446 |

Referring to Table 4, since the transmittance of the adhesive sheet according to Comparative Example 1 was 29.1% with respect to 410 wavelength light and the transmittance of the adhesive sheet according to Comparative Example 2 was 6.9% with respect to 410 wavelength light, it was confirmed that the transmittance with respect to 405 to 420 nm wavelength light region was lowered and the color temperature change amount was reduced when the amount of the first light absorption dye was increased. However, the transmittance with respect to 405 to 550 nm wavelength light region for the adhesive sheet according to Comparative Example 3 could not be measured due to the cloudiness effect occurrence.

In addition, for the adhesive sheet according to Comparative Examples 4 to 6, it was confirmed that the transmittance with respect to 405 to 420 nm wavelength light region was lowered and the color temperature change amount was reduced when the amount of the second light absorption dye was increased.

However, when the amount of the dye was increased in Comparative Examples 4 to 6, i.e., the problem of crystallization and deterioration of the adhesion strength for the second light absorption dye through the low temperature and thermal shock reliability test was confirmed.

Moreover, for the adhesive sheet according to Embodiments 1 to 5, it can be seen that it is effective for blocking the ultraviolet light since the transmittance with respect to 405 to 420 nm wavelength light region was lowered and the color temperature change amount was reduced when the amount of the second light absorption dye was increased. However, it was confirmed that the adhesion strength was lowered with the same reason as Comparative Examples 4 and 5. It can be seen that 405 to 420 nm region was effectively blocked and the adhesion strength was increased when the amount of the first light absorption dye was increased. On the contrary, the transmittance with respect to 405 to 550 nm wavelength light region could not be measured since the cloudiness effect occurred on the adhesive sheet according to Embodiment 1.

Note that, the reason for the cloudiness effect occurrence for Comparative Example 3 and Embodiment 1 is because the amount of the light absorption dye contained in the binder resin was increased, it is decided that the cloudiness effect occurred due to the comparability problem for the binder and the light absorption dye.

Moreover, the wavelength value (T20%) at 20% of the transmittance with respect to 405 to 430 nm wavelength region was measured and the wavelength value (T10%) at 10% of the transmittance with respect to 405 to 430 nm wavelength region was measured for the adhesive sheet prepared by Embodiments 2 to 5.

As a result, it was confirmed that the wavelength value of the difference (|T20%−T10%|) is 5 nm or less. Specifically, there was a difference of 1 to 3 nm.

What is claimed is:

1. An adhesive sheet comprising:
   a structure wherein a first light absorption dye and a second light absorption dye are dispersed in an adhesive binder resin;
   a combined amount of the first light absorption dye and the second light absorption dye is 90 parts by weight or less with a reference to 100 parts by weight of the adhesive binder resin; and
   the first light absorption dye is represented by a Formula 1 and the second light absorption dye is represented by a Formula 2 wherein the Formula 1 is:

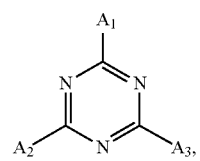

[Formula 1]

in the Formula 1, $A_1$, $A_2$ and $A_3$ are each independently a phenyl or a Formula 1-a; and at least one or more of $A_1$, $A_2$ and $A_3$ are the Formula 1-a; and

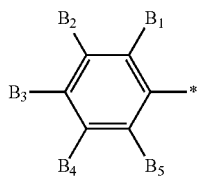

[Formula 1-a]

in the Formula 1-a, $B_1$ to $B_5$ are each independently a hydrogen, a hydroxy group, an alkyl group having a carbon number of 1 to 20, a cycloalkyl group having a carbon number of 3 to 20, an alkoxy group having a carbon number of 1 to 10, an aralkyl group having a carbon number of 7 to 20, an aryl group having a carbon number of 6 to 18, or a Formula 1-b; and

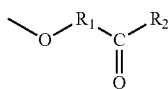

[Formula 1-b]

in the Formula 1-b, $R_1$ is an alkylene having a carbon number of 1 to 6, $R_2$ is a hydrogen, a hydroxy group, an alkoxy group having a carbon number 1 of 16, an alkyl group having a carbon number 1 of 12 or an alkylamine group having a carbon number of 1 to 12; and at least one or more hydrogen of $A_1$, $A_2$ and $A_3$ in the Formula 1 are each independently substituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, a heteroaryl group having a carbon number of 2 to 20, an aryloxy group having a carbon number of 6 to 20, an arylthio group having a carbon number of 6 to 20, alkoxycarbonyl group having a carbon number 1 of 12, a halogen group, a cyano group, a nitro group, a hydroxyl group and a carboxyl group; and

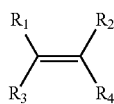

[Formula 2]

In the Formula 2, $R_1$ to $R_3$ are each independently a hydrogen, a cyano group, or represented by a Formula 2-a; and

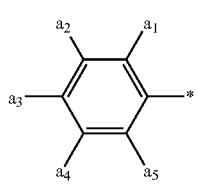

[Formula 2-a]

in the Formula 2-a, $a_1$ to $a_5$ are each independently a hydrogen, an alkyl group having a carbon number of 1 to 20, a cycloalkyl group having a carbon number of 3 to 20 carbon, an alkoxy group having a carbon number of 1 to 10, an aralkyl group having a carbon number of 7 to 20, or an aryl group having a carbon number of 6 to 18; and $R_4$ is a hydrogen, a cyano group, or a Formula 2-b; and

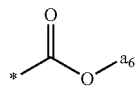

[Formula 2-b]

in the Formula 2-b, $a_6$ is a hydrogen or an alkyl group having a carbon number of 1 to 18; and at least one or more hydrogen of $R_1$ to $R_4$ in the Formula 2 are each independently substituted by one selected from a group consisting of an alkyl group having a carbon number of 1 to 6, an alkenyl group having a carbon number of 1 to 6, an alkoxy group having a carbon number of 1 to 6, an aryl group having a carbon number of 6 to 20, an heteroaryl group having a carbon number of 2 to 20, an aryloxy group having a carbon number of 6 to 20, an arylthio group having a carbon number of 6 to 20, an alkoxycarbonyl group having a carbon number of 1 to 6, a halogen group, a cyano group, a nitro group, a hydroxyl group and a carboxy group, wherein the adhesive sheet satisfies a Condition 1 and a Condition 2 where

[Condition 1]

a light transmittance for a 405 nm wavelength is 5% or less;

a light transmittance for a 410 nm wavelength is 10% or less; and a light transmittance for a 420 nm wavelength is 60% or less; and

[Condition 2]

a light transmittance for a 430 nm wavelength is 75% or more.

2. The adhesive sheet of claim 1, wherein the sheet satisfies a Condition 3 where $|T_{20\%} - T_{10\%}| < 5$ (nm) wherein [Condition 3]

$T_{20\%}$ represents a wavelength value where a light transmittance is 20% in 405 to 430 nm wavelength range; and $T_{10\%}$ represents a wavelength value where a light transmittance is 10% in 405 to 430 nm wavelength range.

3. An adhesive composition comprising:

a binder resin; and a first light absorption dye and a second light absorption dye dispersed in the binder resin wherein the first light absorption dye is represented by a Formula 1 and the second light absorption dye is represented by a Formula 2 wherein the Formula 1 is:

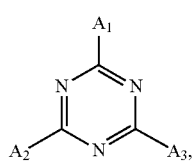

[Formula 1]

in the Formula 1,
A$_1$, A$_2$ and A$_3$ are a Formula 1-a;

[Formula 1-a]

in the Formula 1-a,
one of B$_1$ and B$_5$ is hydroxy and the other is hydrogen, B$_2$ and B$_4$ are hydrogen, and B$_3$ is a Formula 1-b; and

[Formula 1-b]

in the Formula 1-b,
R$_1$ is an alkylene having a carbon number of 1 to 6, R$_2$ is a hydrogen, a hydroxy group, an alkoxy group having a carbon number 1 of 16, an alkyl group having a carbon number 1 of 12 or an alkylamine group having a carbon number of 1 to 12;

[Formula 2]

in the Formula 2,
R$_2$ is a cyano group, R$_3$ is a hydrogen,
R$_1$ is or and
R$_4$ is a Formula 2-b;

[Formula 2-b]

in the Formula 2-b,
a$_6$ is a hydrogen or an alkyl group having a carbon number of 1 to 18;
wherein the adhesive sheet satisfies a Condition 1 and a Condition 2 where

[Condition 1]
a light transmittance for a 405 nm wavelength is 5% or less;
a light transmittance for a 410 nm wavelength is 10% or less; and
a light transmittance for a 420 nm wavelength is 60% or less; and
[Condition 2]
a light transmittance for a 430 nm wavelength is 75% or more.

4. The adhesive composition of claim 3, wherein the A$_1$, A$_2$ and A$_3$ are the same and are one from the following Structures 1 to 9 for the Formula 1 explanation:

Structure 1

Structure 2

Structure 3

Structure 4

Structure 5

Structure 6

Structure 7

-continued

Structure 8

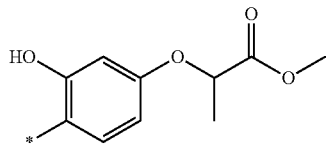

Structure 9

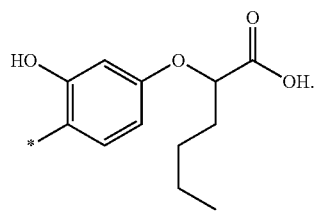

5. The adhesive composition of claim 3, wherein the second light absorbing dye is represented by a Formula 4:

[Formula 4]

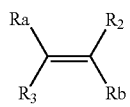

in the Formula 4,
$R_2$ is a cyano group;
$R_3$ is a hydrogen; and
$R_a$ is

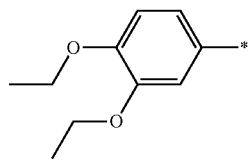

and
$R_b$ is represented by a Formula 4-b; and

[Formula 4-b]

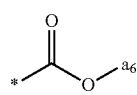

in the Formula 4-b,
$a_6$ is a hydrogen or an alkyl group having a carbon number of 1 to 10.

6. The adhesive composition of claim 3, wherein the $R_1$ to $R_4$ are one from the following Structures 1-2 for the Formula 2 explanation:
Structure 1:

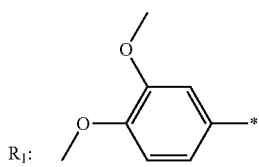 [SMILES: *c1ccc(OC)c(OC)c1]

$R_2$: —CN, $R_3$: —H

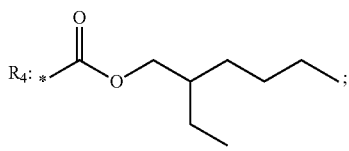 [SMILES: *C(=O)OCC(CC)CCCC]

Structure 2:

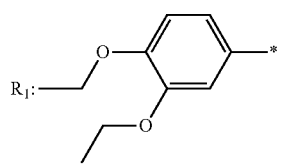 [SMILES: *c1ccc(OCC)c(OCC)c1]

$R_2$: —CN,
$R_3$: —H,

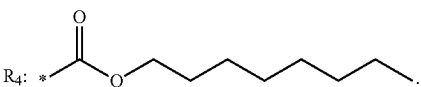 [SMILES: *C(=O)OCCCCCCCC]

7. The adhesive composition of claim 3, wherein a combined amount of the first light absorption dye and the light second absorption dye dispersed in the binder resin is 3 to 90 parts by weight with a reference to 100 parts by weight of the binder resin.

8. The adhesive composition of claim 3, wherein an amount ratio of the first light absorption dye and the second light absorption dye is in 1:99 to 99:1 weight ratio range.

9. The adhesive composition of claim 3, further comprising a particulate component having an average refractive index in a range of 1.3 to 2.1.

10. The adhesive composition of claim 9, wherein the particulate component comprising at least one or more of:
at least one or more metal particles selected from a group consisting of a metal oxide, a metal nitride, and a metal oxynitride;
at least one or more organic particles selected from a group consisting of a silicone resin and acryl resin; or
an organic-inorganic particle containing a composition constituting the metal particle and the organic particle.

11. The adhesive composition of claim 9, wherein an average diameter of the particulate component is in a range of 0.1 to 5 µm.

12. The adhesive composition of claim 9, wherein a refractive index difference between the particulate component and the binder resin is 0.05 or more.

13. A display device comprising:
an adhesive layer formed of the adhesive composition of claim 3.

* * * * *